(12) United States Patent
Chew et al.

(10) Patent No.: US 11,216,227 B2
(45) Date of Patent: Jan. 4, 2022

(54) PRINTER FOR DETERMINING APPROPRIATE PRINTING MEDIUM

(71) Applicant: BROTHER KOGYO KABUSHIKI KAISHA, Nagoya (JP)

(72) Inventors: Po Chun Chew, Nagoya (JP); Koshi Fukazawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/087,721

(22) Filed: Nov. 3, 2020

(65) Prior Publication Data
US 2021/0132882 A1    May 6, 2021

(30) Foreign Application Priority Data
Nov. 4, 2019 (JP) .............................. JP2019-200356

(51) Int. Cl.
*G06F 3/12* (2006.01)

(52) U.S. Cl.
CPC .......... *G06F 3/1252* (2013.01); *G06F 3/1206* (2013.01); *G06F 3/1236* (2013.01); *G06F 3/1268* (2013.01)

(58) Field of Classification Search
None
See application file for complete search history.

(56) References Cited

U.S. PATENT DOCUMENTS

| | | | | |
|---|---|---|---|---|
| 5,676,475 A | * | 10/1997 | Dull | B41J 29/02 347/37 |
| 2008/0187328 A1 | * | 8/2008 | Schoedinger | G03G 15/2014 399/21 |
| 2019/0070863 A1 | * | 3/2019 | Ho | B41J 2/362 |

FOREIGN PATENT DOCUMENTS

JP    2014-63386 A    4/2014

* cited by examiner

*Primary Examiner* — Eric A. Rust
(74) *Attorney, Agent, or Firm* — Scully, Scott, Murphy & Presser, PC

(57) ABSTRACT

When receiving a sheet size measurement instruction through a user interface, an information processing apparatus transmits a width measurement instruction to a printer through a communication I/F. When receiving a measurement result of a sheet width from the printer, a controller extracts sheet information that meets the received measurement result and displays the extracted sheet information for user selection. When a user selection is received, the controller updates a print setting with selected sheet information. When a user selection is not received, the controller transmits a type-designated measurement instruction designating the sheet type. When the measurement result is received, the controller updates the print setting with a sheet length information included in the received measurement result.

16 Claims, 14 Drawing Sheets

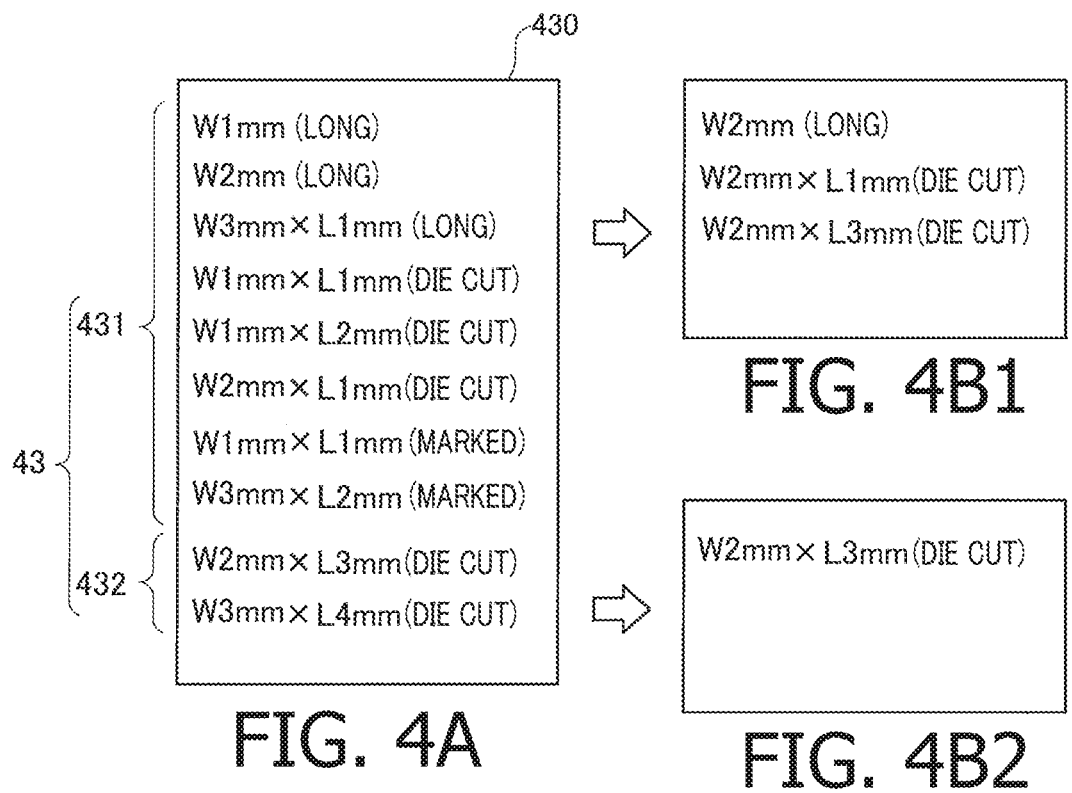
FIG. 4A
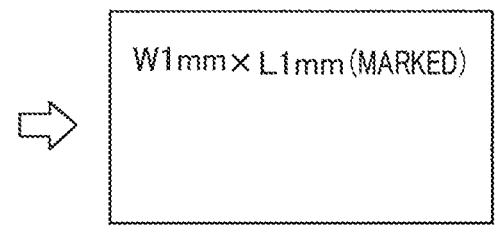
FIG. 4B1
FIG. 4B2
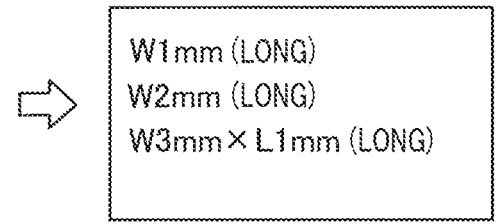
FIG. 4B3
FIG. 4B4

PRINTER FOR DETERMINING APPROPRIATE PRINTING MEDIUM

CROSS-REFERENCE TO RELATED APPLICATIONS

This application claims priority under 35 U.S.C. § 119 from Japanese Patent Application No. 2019-200356 filed on Nov. 4, 2019. The entire subject matter of the application is incorporated herein by reference.

BACKGROUND

Technical Field

The present disclosures relate to an information processing apparatus, a non-transitory computer-readable recording medium containing computer-executable instructions therefor, and a printer connected to such an information processing apparatus.

Related Art

There has been known a technique according to which an information processing apparatus such as a personal computer is configured to store a user-defined sheet size, and a user is allowed to set a printing medium to be used for printing based on the user-defined sheet size. According to such a conventional technique, when the user-defined sheet size is designated in print data output by the information processing apparatus, an appropriate printing medium is selected by a management server.

SUMMARY

There is known a printer configured to perform an automatic detection function to detect a type and a size of a printing medium loaded to the printer. In such a printer, typically, the printing medium loaded to the printer is fed to detect the size of the printing medium. The information processing apparatus is configured to obtain the detected sheet size from the printer, and enables the user to register the obtained sheet as the user-defined sheet size. According to such a configuration, the user can set an appropriate sheet size to the printer even if the user does not know details of the printing medium currently loaded to the printer.

According to the automatic detection function, the sheet size can be defined conveniently. However, since the automatic detection function requires feeding of the sheet by a certain amount to detect the size of the sheet, there could be a case where the fed portion of the sheet is wasted uselessly and improvement of the automatic detection function has been desired.

According to aspects of the present disclosures, there is provided a non-transitory computer-readable recording medium for an information processing apparatus having a user interface, a communication interface and a controller, the image forming apparatus being connectable to a printer. The recording medium stores instructions which cause, when executed by the controller, the image processing apparatus to perform a measurement instruction receiving process of receiving a user input of a measurement instruction of a sheet size through the user interface of the image processing apparatus, when the measurement instruction is received in the measurement instruction receiving process, a first transmission process of transmitting a first request requesting for execution of a first measurement to measure a width of a sheet to the printer through the communication interface, the printer being configured to measure the sheet loaded to the printer and output a measurement result in response to the first request, when receiving a first measurement result, which is the measurement result transmitted by the printer in response to the first request, through the communication interface, an extraction process of extracting, from among sheet data stored in a memory of the information processing apparatus and including information of a width and a length and sheet type of each sheet, sheet data corresponding to the width that meets the sheet width in the received first measurement result from the sheet data, and a first setting receiving process of prompting the user to select one piece of the sheet data extracted in the extraction process and receiving a setting instruction regarding the selected sheet data through the user interface, and when the setting instruction is received in the first setting receiving process, a first setting process of setting information included in the sheet data subjected to setting as a sheet size to be used for printing. When the setting instruction is not received in the first setting receiving process, a second transmission process of transmitting a second request requesting execution of a second measurement to identify a sheet type and measure a length of the sheet to the printer through the communication interface. The printer is configured such that, when receiving the second request, the printer feeds the sheet loaded to the printer to measure a length of the sheet and output the measurement result in accordance with the sheet type identified by the second request. When the printer, which received the second request measures the length of the sheet regarding the sheet type of the sheet is the identified sheet type, receives the second measurement result which is the measurement result of the sheet regarding the sheet is of the identified sheet type through the communication interface, a second setting process of setting information included in the received second measurement result as the sheet size used for printing.

According to aspects of the present disclosures, there is provided a non-transitory computer-readable recording medium for an information processing apparatus having a user interface, a communication interface and a controller, the image forming apparatus being connectable to a printer. The recording medium stores instructions which cause, when executed by the controller, the image processing apparatus to perform a measurement instruction receiving process of receiving a user input of a measurement instruction of a sheet size through the user interface of the image processing apparatus, when the measurement instruction is received in the measurement instruction receiving process, a measurement request transmission process of transmitting a measurement request requesting for execution of a particular sheet type measurement to measure a length of a sheet with identifying the sheet type to the printer through the communication interface, the printer having a measurement function to feed the printing medium loaded to the printer and measure the length of the sheet in accordance with the sheet type identified by the measurement request and output a result of the measurement when the measurement request is received, and when, in the printer that received the measurement request, the length of the sheet regarding the sheet as the sheet of the identified sheet type, and when the measurement result of the sheet in accordance with the identified sheet type is received through the communication interface, causes the controller to perform a setting process of setting the information included in the received measurement result as the sheet size to be used for printing. In the measurement request transmission process, multiple measurement requests can be sequentially transmitted with changing the sheet types to be identified. When sheet data stored in a memory of the information processing apparatus and including information of a sheet width, a sheet length and a sheet type includes sheet data of which sheet type is a first type and does not include sheet data of which sheet type is a second type which is different from the first type, the controller transmits the measurement request regarding the sheet loaded to the printer as the sheet of which type is the first type. When the sheet length regarding the sheet as of the first type cannot be measured, the sheet type of the sheet loaded to the printer as the sheet of which type is the second type.

According to aspects of the present disclosures, there is provided a non-transitory computer-readable recording medium for an information processing apparatus having a user interface, a communication interface and a controller, the image forming apparatus being connectable to a printer. The recording medium stores instructions which cause, when executed by the controller, the image processing apparatus to perform a measurement instruction receiving process of receiving a user input of a measurement instruction of a sheet size through the user interface of the image processing apparatus, when the measurement instruction is received in the measurement instruction receiving process, a measurement request transmission process of transmitting a measurement request requesting for execution of a particular sheet type measurement to measure a length of a sheet with identifying the sheet type to the printer through the communication interface, the printer having a measurement function to feed the printing medium loaded to the printer and measure the length of the sheet in accordance with the sheet type identified by the measurement request and output a result of the measurement when the measurement request is received, and when, in the printer that received the measurement request, the length of the sheet regarding the sheet as the sheet of the identified sheet type, and when the measurement result of the sheet in accordance with the identified sheet type is received through the communication interface, causes the controller to perform a setting process of setting the information included in the received measurement result as the sheet size to be used for printing. In the measurement request transmission process, multiple measurement requests can be sequentially transmitted with changing the sheet types to be identified. When the controller transmits the measurement request with identifying the sheet type as the first sheet type designated through the user interface. When the sheet length cannot be measures as the first type sheet, the controller sets the sheet type of the sheet as a second type which is different from the first type.

According to aspects of the present disclosures, there is provided an information processing apparatus having a user interface, a communication interface, a memory and a controller configured to perform a measurement instruction receiving process of receiving a user input of a measurement instruction of a sheet size through the user interface of the image processing apparatus, when the measurement instruction is received in the measurement instruction receiving process, a first transmission process of transmitting a first request requesting for execution of a first measurement to measure a width of a sheet to a printer connected to the information processing apparatus through the communication interface, the printer being configured to measure the sheet loaded to the printer and output a measurement result in response to the first request, when receiving a first measurement result, which is the measurement result transmitted by the printer in response to the first request, through the communication interface. The controller is further configured to perform an extraction process of extracting, from among sheet data stored in a memory of the information processing apparatus and including information of a width and a length and sheet type of each sheet, sheet data corresponding to the width that meets the sheet width in the received first measurement result from the sheet data, a first setting receiving process of prompting the user to select one piece of the sheet data extracted in the extraction process and receiving a setting instruction regarding the selected sheet data through the user interface, when the setting instruction is received in the first setting receiving process, a first setting process of setting information included in the sheet data subjected to setting as a sheet size to be used for printing, when the setting instruction is not received in the first setting receiving process, a second transmission process of transmitting a second request requesting execution of a second measurement to identify a sheet type and measure a length of the sheet to the printer through the communication interface, the printer being configured such that, when receiving the second request, the printer feeds the sheet loaded to the printer to measure a length of the sheet and output the measurement result in accordance with the sheet type identified by the second request, and when the printer, which received the second request measures the length of the sheet regarding the sheet type of the sheet is the identified sheet type, receives the second measurement result which is the measurement result of the sheet regarding the sheet is of the identified sheet type through the communication interface, a second setting process of setting information included in the received second measurement result as the sheet size used for printing.

According to aspects of the present disclosures, there is provided an information processing apparatus, having a user interface, a communication interface, a memory and a controller configured to perform a measurement instruction receiving process of receiving a user input of a measurement instruction of a sheet size through the user interface of the image processing apparatus, when the measurement instruction is received in the measurement instruction receiving process, a measurement request transmission process of transmitting a measurement request requesting for execution of a particular sheet type measurement to measure a length of a sheet with identifying the sheet type to the printer through the communication interface, the printer having a measurement function to feed the printing medium loaded to the printer and measure the length of the sheet in accordance with the sheet type identified by the measurement request and output a result of the measurement when the measurement request is received, and when, in the printer that received the measurement request, the length of the sheet regarding the sheet as the sheet of the identified sheet type, and when the measurement result of the sheet in accordance with the identified sheet type is received through the communication interface, causes the controller to perform a setting process of setting the information included in the received measurement result as the sheet size to be used for printing. In the measurement request transmission process, multiple measurement requests can be sequentially transmitted with changing the sheet types to be identified. When sheet data stored in a memory of the information processing apparatus and including information of a sheet width, a sheet length and a sheet type includes sheet data of which sheet type is a first type and does not include sheet data of which sheet type is a second type which is different from the first type, the controller transmits the measurement request regarding the sheet loaded to the printer as the sheet of which type is the first type. Further, when the sheet length regarding the sheet as of the first type cannot be measured, the sheet type of the sheet loaded to the printer as the sheet of which type is the second type.

According to aspects of the present disclosures, there is provided an information processing apparatus which is provided with a user interface, a communication interface, a memory and a controller configured to perform a measurement instruction receiving process of receiving a user input of a measurement instruction of a sheet size through the user interface of the image processing apparatus, when the measurement instruction is received in the measurement instruction receiving process, a measurement request transmission process of transmitting a measurement request requesting for execution of a particular sheet type measurement to measure a length of a sheet with identifying the sheet type to the printer through the communication interface, the printer having a measurement function to feed the printing medium loaded to the printer and measure the length of the sheet in accordance with the sheet type identified by the measurement request and output a result of the measurement when the measurement request is received, and when, in the printer that received the measurement request, the length of the sheet regarding the sheet as the sheet of the identified sheet type, and when the measurement result of the sheet in accordance with the identified sheet type is received through the communication interface, a setting process of setting the information included in the received measurement result as the sheet size to be used for printing. In the measurement request transmission process, multiple measurement requests can be sequentially transmitted with changing the sheet types to be identified. When the controller transmits the measurement request with identifying the sheet type as the first sheet type designated through the user interface, and wherein when the sheet length cannot be measures as the first type sheet, the controller sets the sheet type of the sheet as a second type which is different from the first type.

According to aspects of the present disclosures, there is provided a printer which is provided with a user interface, a memory, and a controller configured to perform a measurement instruction receiving process of receiving a user input of a measurement instruction of a sheet size through the user interface of the image processing apparatus, when the measurement instruction is received in the measurement instruction receiving process, a width measurement process of measuring a width of a sheet loaded to the printer, an extraction process of extracting, from among sheet data stored in the memory and including information of a width and a length and sheet type of each sheet, sheet data corresponding to the width that meets the sheet width in the received first measurement result from the sheet data, and a first setting receiving process of prompting the user to select one piece of the sheet data extracted in the extraction process and receiving a setting instruction regarding the selected sheet data through the user interface. When the setting instruction is received in the first setting receiving process, a first setting process of setting information included in the sheet data subjected to setting as a sheet size to be used for printing. When the setting instruction is not received in the first setting receiving process, a second transmission process of transmitting a second request requesting execution of a second measurement to identify a sheet type and measure a length of the sheet to the printer through the communication interface. When the length of the sheet regarding the sheet type of the sheet is the identified sheet type is measured in the length measurement process, a second setting process of setting information included in the measurement result of the length measurement process as the sheet size used for printing.

According to aspects of the present disclosures, there is provided a printer which is provided with a user interface, a memory and a controller configured to perform a measurement instruction receiving process of receiving a user input of a measurement instruction of a sheet size through the user interface of the image processing apparatus, when the measurement instruction is received in the measurement instruction receiving process, a length measurement process of identifying a sheet type of the sheet loaded to the printer and feeding the sheet loaded to the printer to measure the length of the sheet in accordance with the identified sheet type, when the length of the sheet regarding the sheet as the sheet of the identified sheet type is measured in the length measurement process, a setting process of setting the information included in the measurement result as the sheet size to be used for printing. In the length measurement process, the measurement can be performed by multiple times with changing the sheet types to be identified. When sheet data stored in the memory and including information of a sheet width, a sheet length and a sheet type includes sheet data of which sheet type is a first type and does not include sheet data of which sheet type is a second type which is different from the first type, the controller performs measurement regarding the sheet loaded to the printer as the sheet of which type is the first type. When the sheet length regarding the sheet as of the first type cannot be measured, the controller performs measurement regarding the sheet loaded to the printer as the sheet of which type is the second type.

According to aspects of the present disclosures, there is provided a printer which is provided with a user interface, a memory and a controller configured to perform a measurement instruction receiving process of receiving a user input of a measurement instruction of a sheet size through the user interface of the image processing apparatus, when the measurement instruction is received in the measurement instruction receiving process, a length measurement process of identifying a sheet type of the sheet loaded to the printer and feeding the sheet loaded to the printer to measure the length of the sheet in accordance with the identified sheet type, when the length of the sheet regarding the sheet as the sheet of the identified sheet type is measured in the length measurement process, a setting process of setting the information included in the measurement result as the sheet size to be used for printing. In the length measurement process, the controller is configured to measure the length of the sheet regarding the sheet loaded to the printer as a first sheet type designated through the user interface, and when the length of the sheet cannot be measured with regarding the sheet as the first type sheet, measure the length of the sheet regarding the sheet as a second type sheet which is different from the first type sheet.

BRIEF DESCRIPTION OF THE ACCOMPANYING DRAWINGS

FIGS. 4A and 4B1-4B4 show examples of confirmation lists.

Figure 5A:
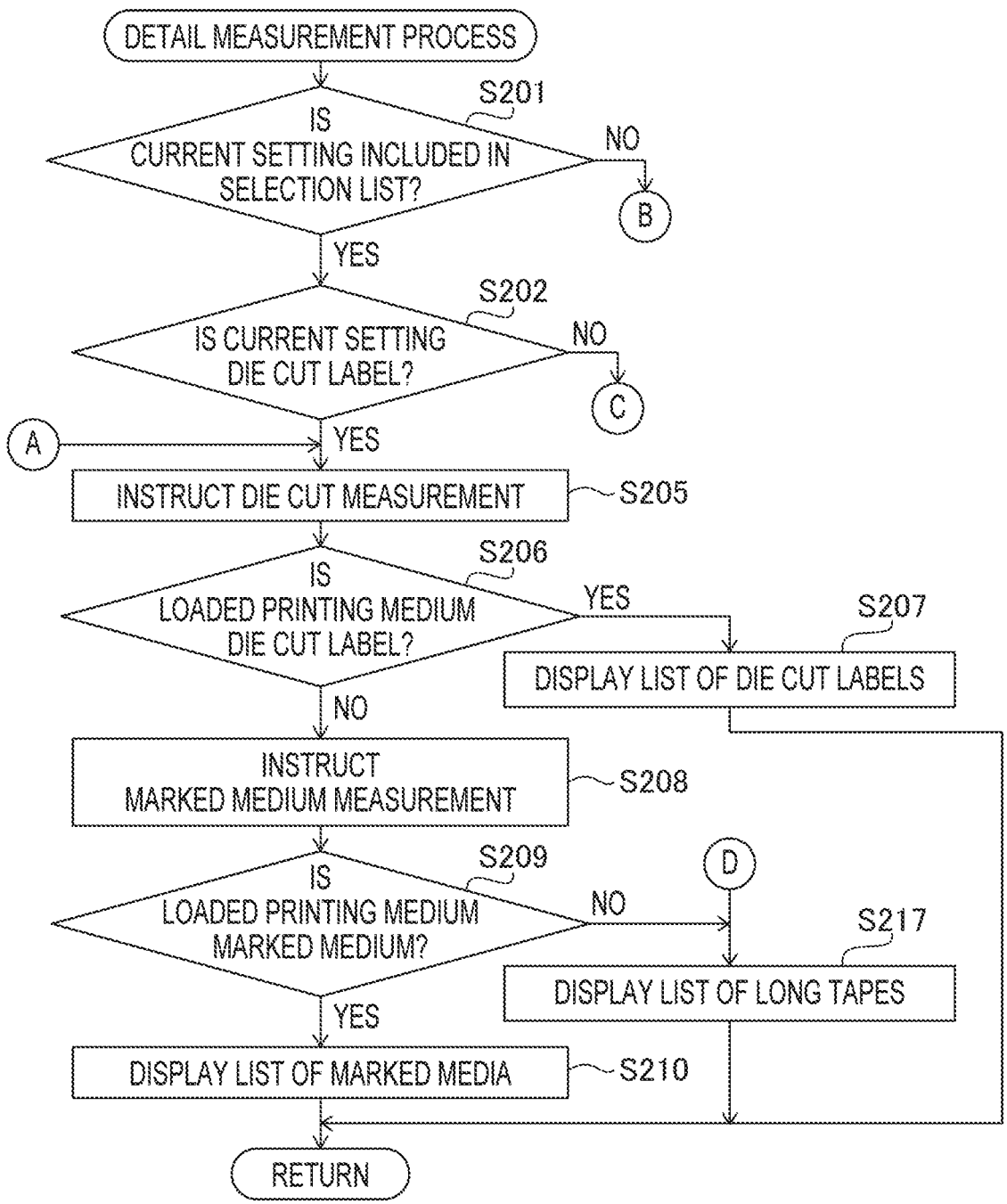
Figure 5B:
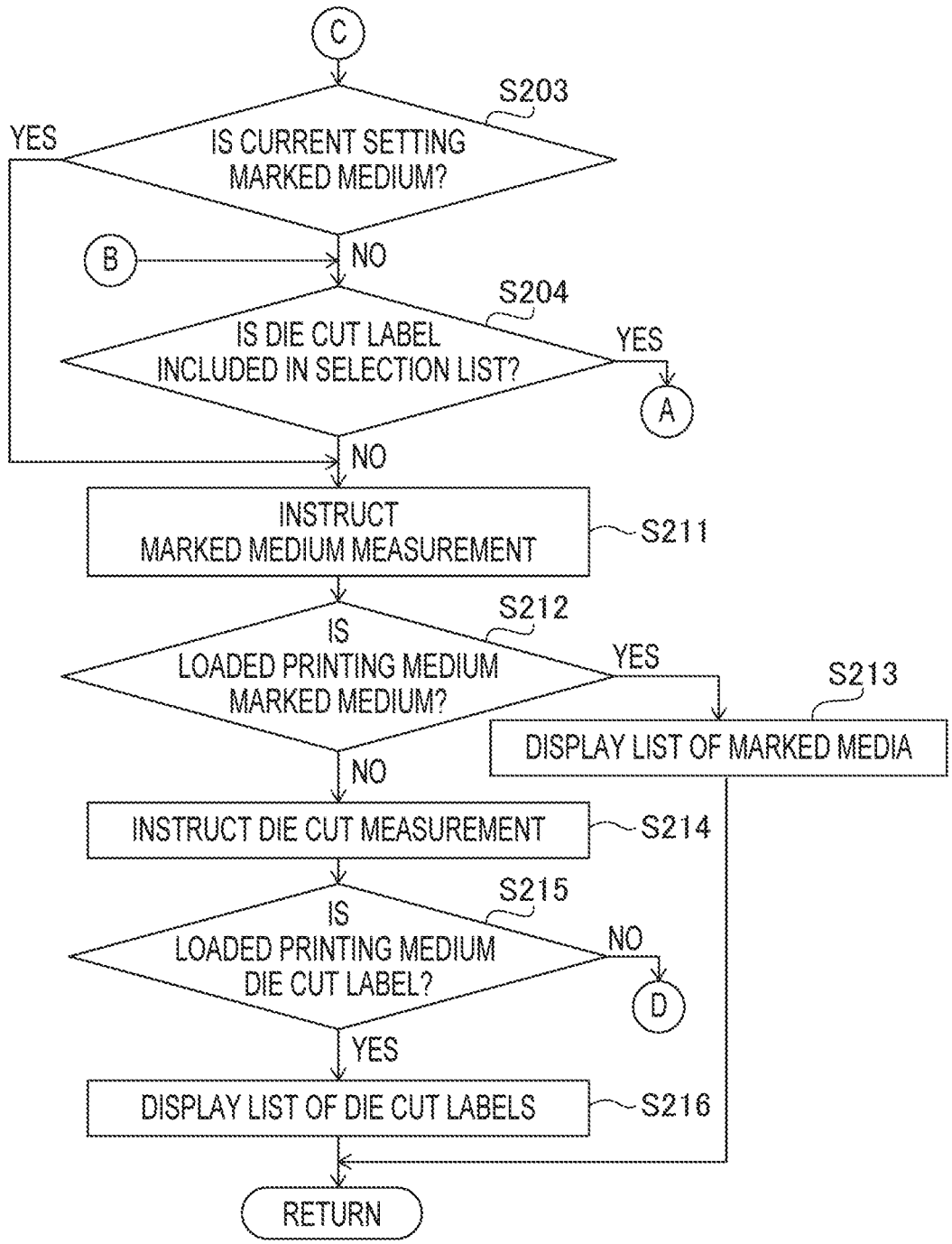

FIGS. 5A and 5B show a flowchart illustrating a detail measurement process.

Figure 6:
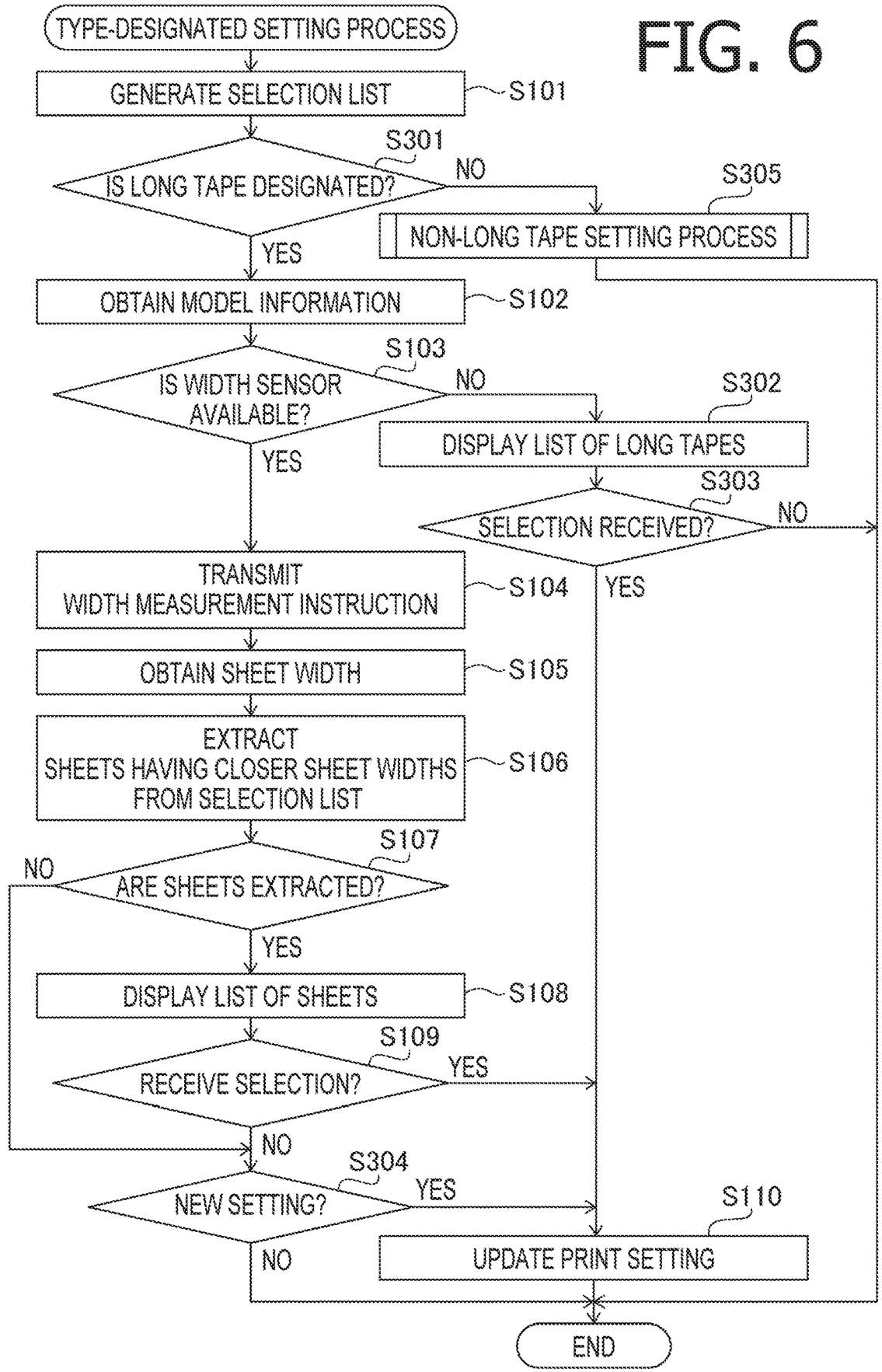

FIG. 6 is a flowchart illustrating a type-designated setting process.

Figure 7:
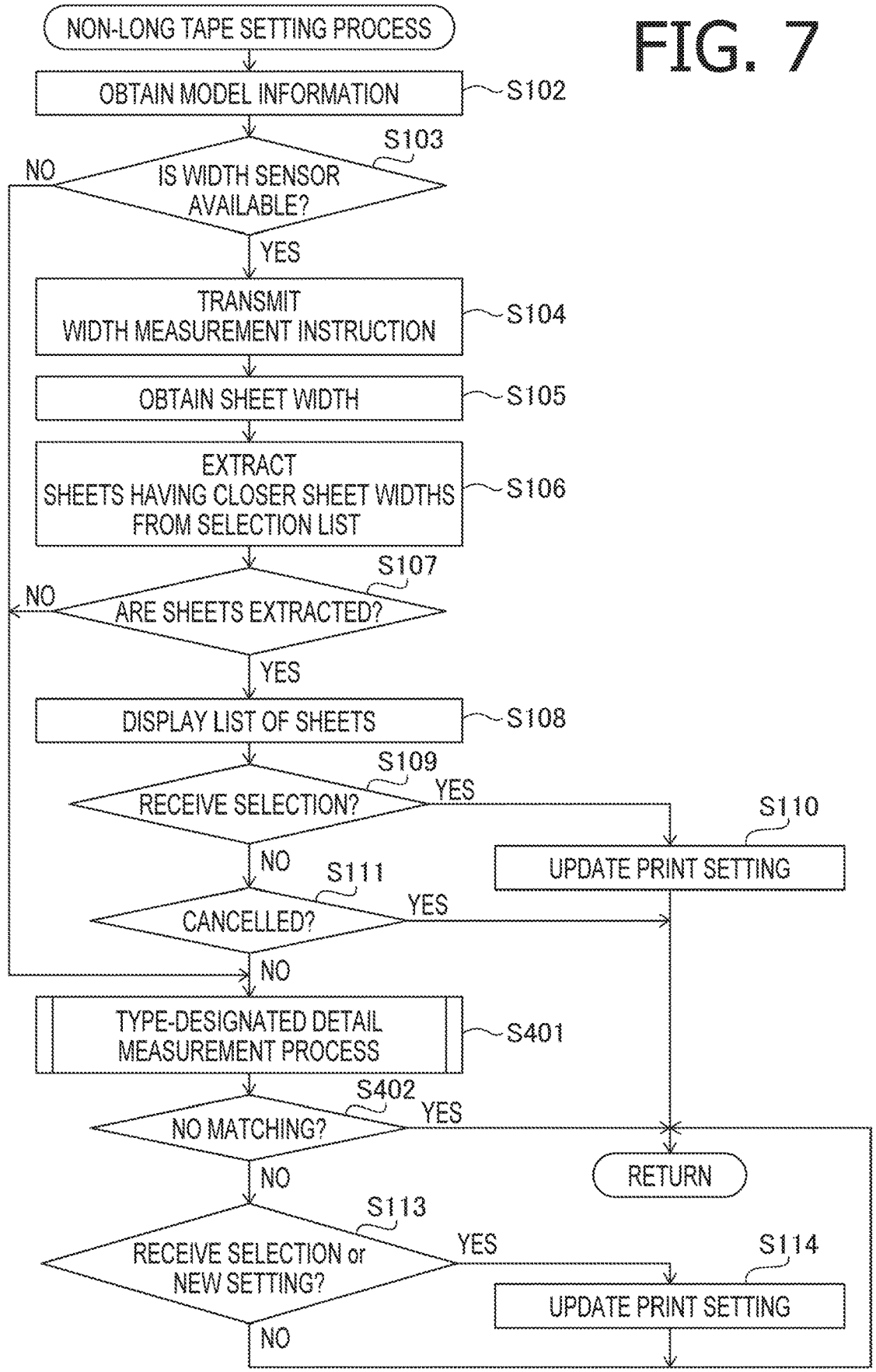

FIG. 7 is a flowchart illustrating a non-long tape setting process.

Figure 8A:
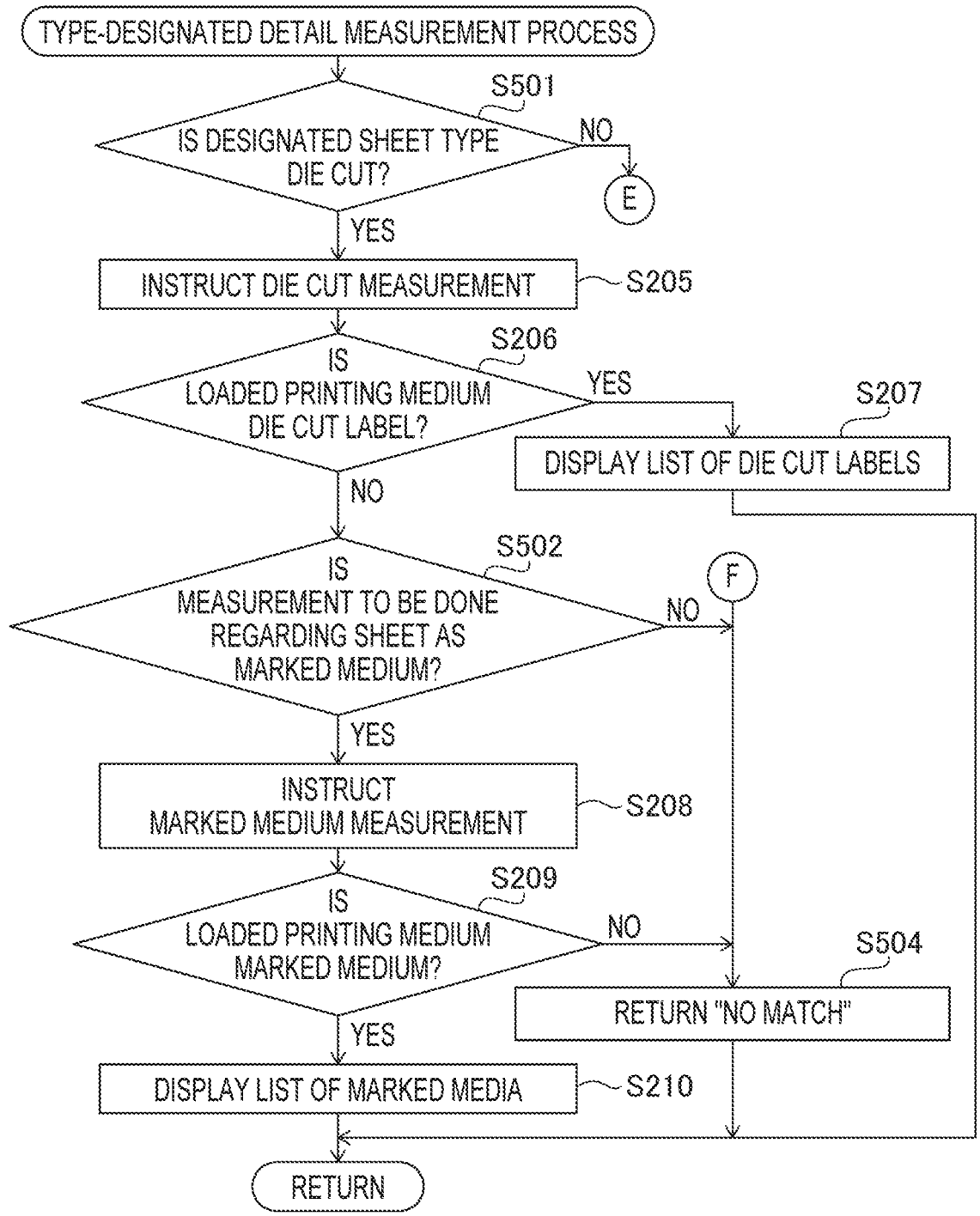
Figure 8B:
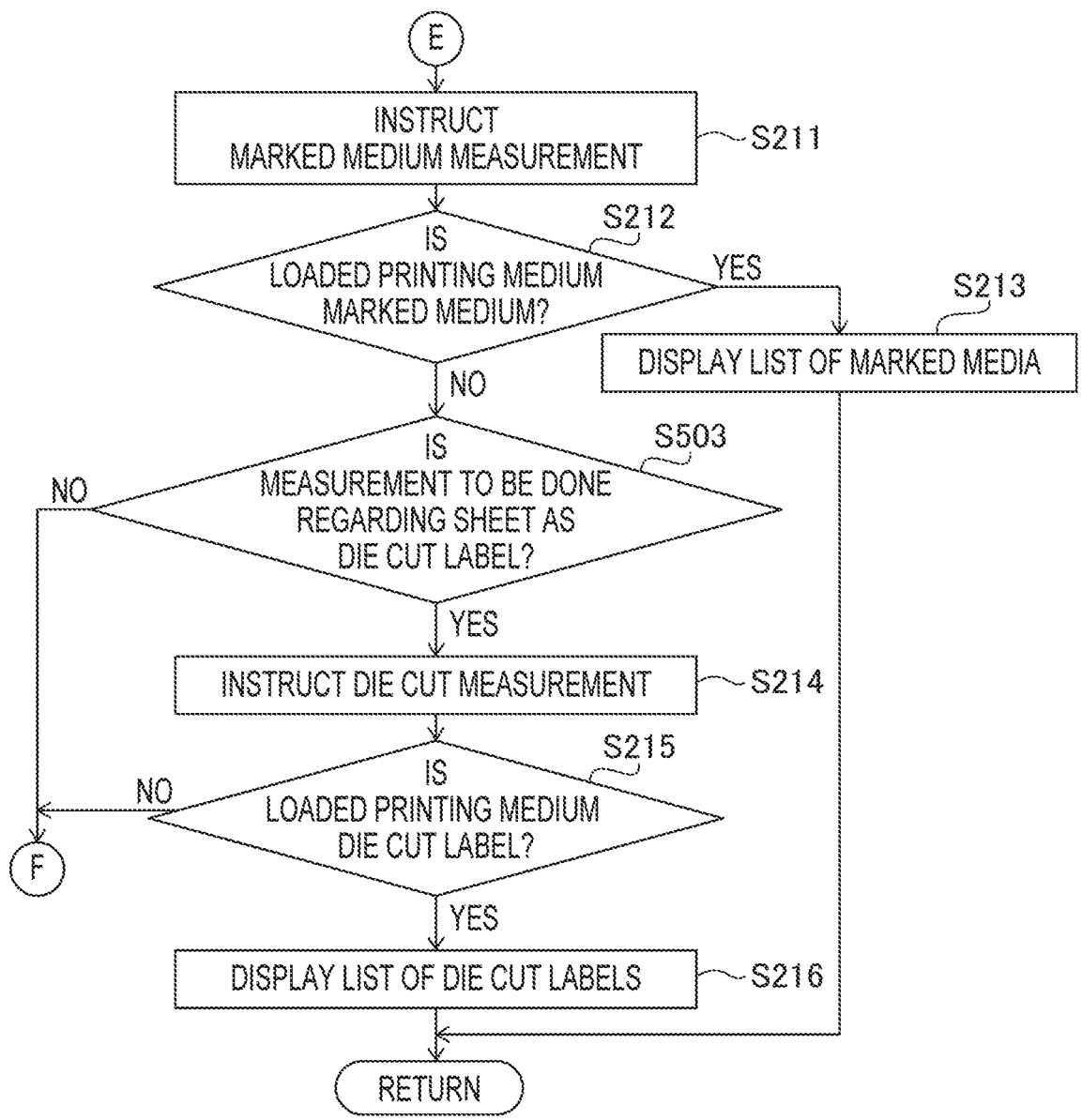

FIGS. 8A and 8B show a flowchart illustrating a detail measurement process.

Figure 9:
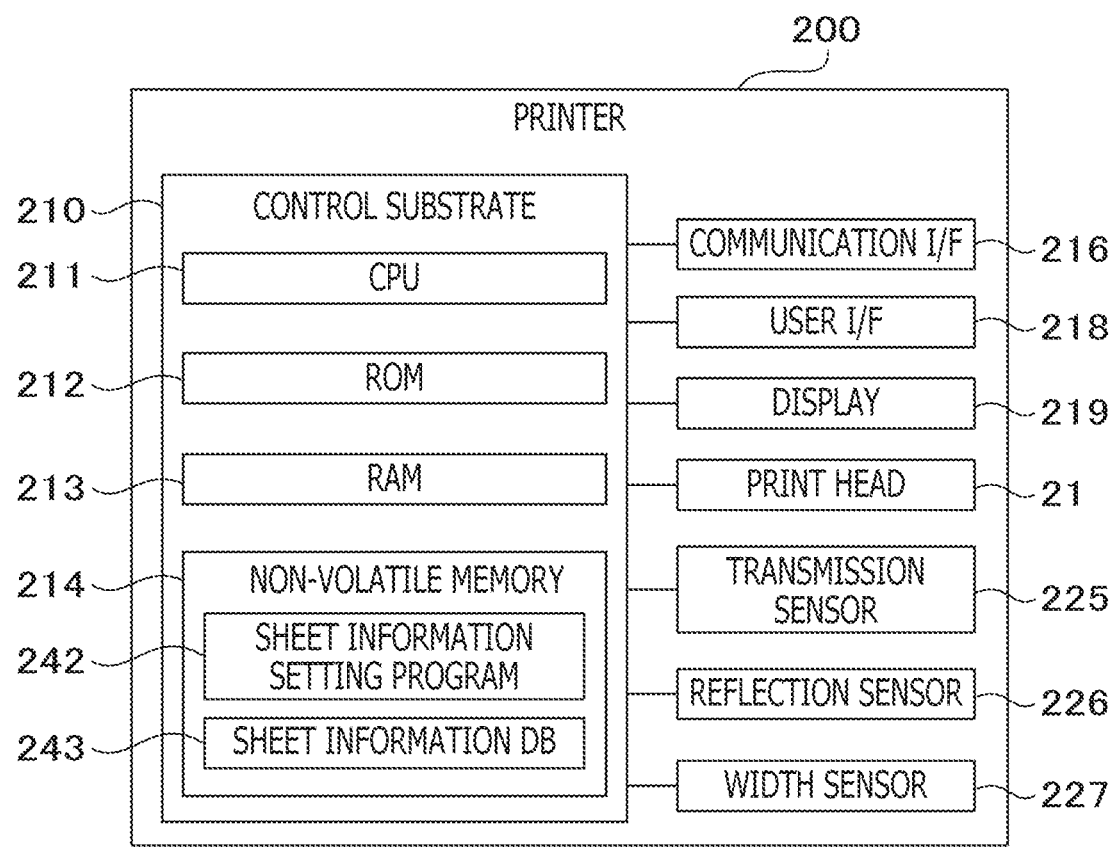

FIG. 9 is a block diagram showing a configuration of a printer according to a second embodiment of the present disclosures.

Figure 10:
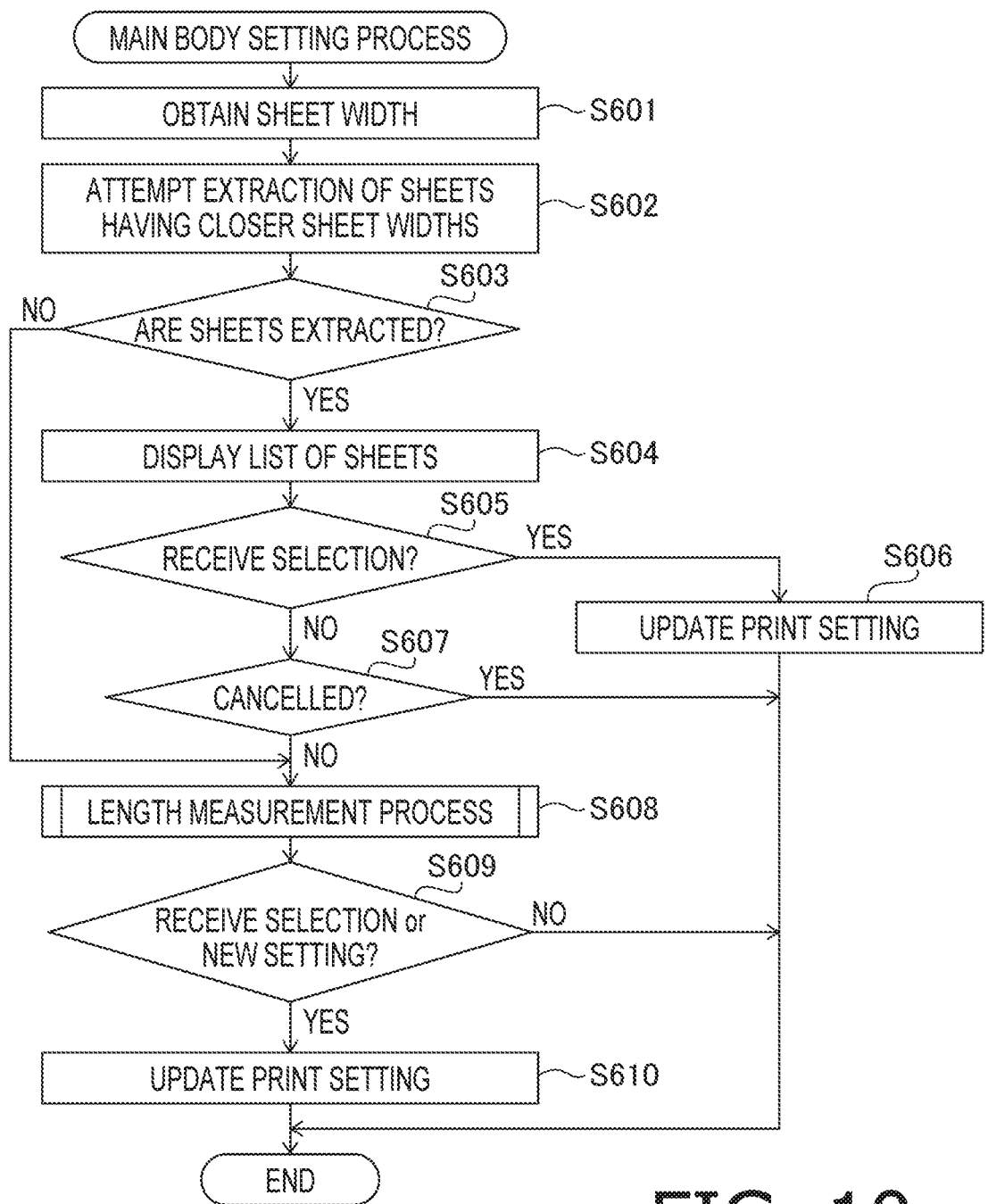

FIG. 10 is a flowchart illustrating a main-body setting process.

Figure 11A:
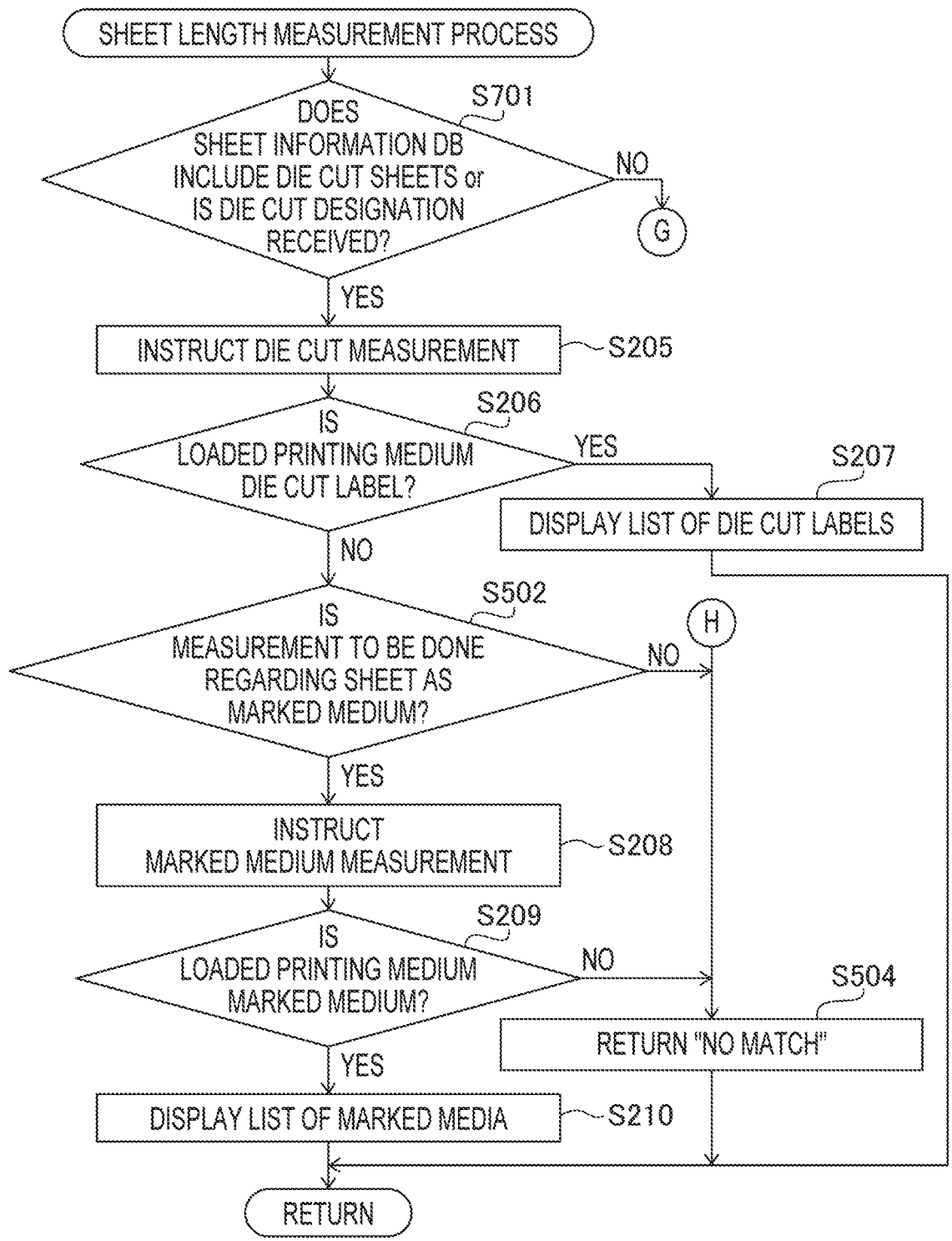
Figure 11B:
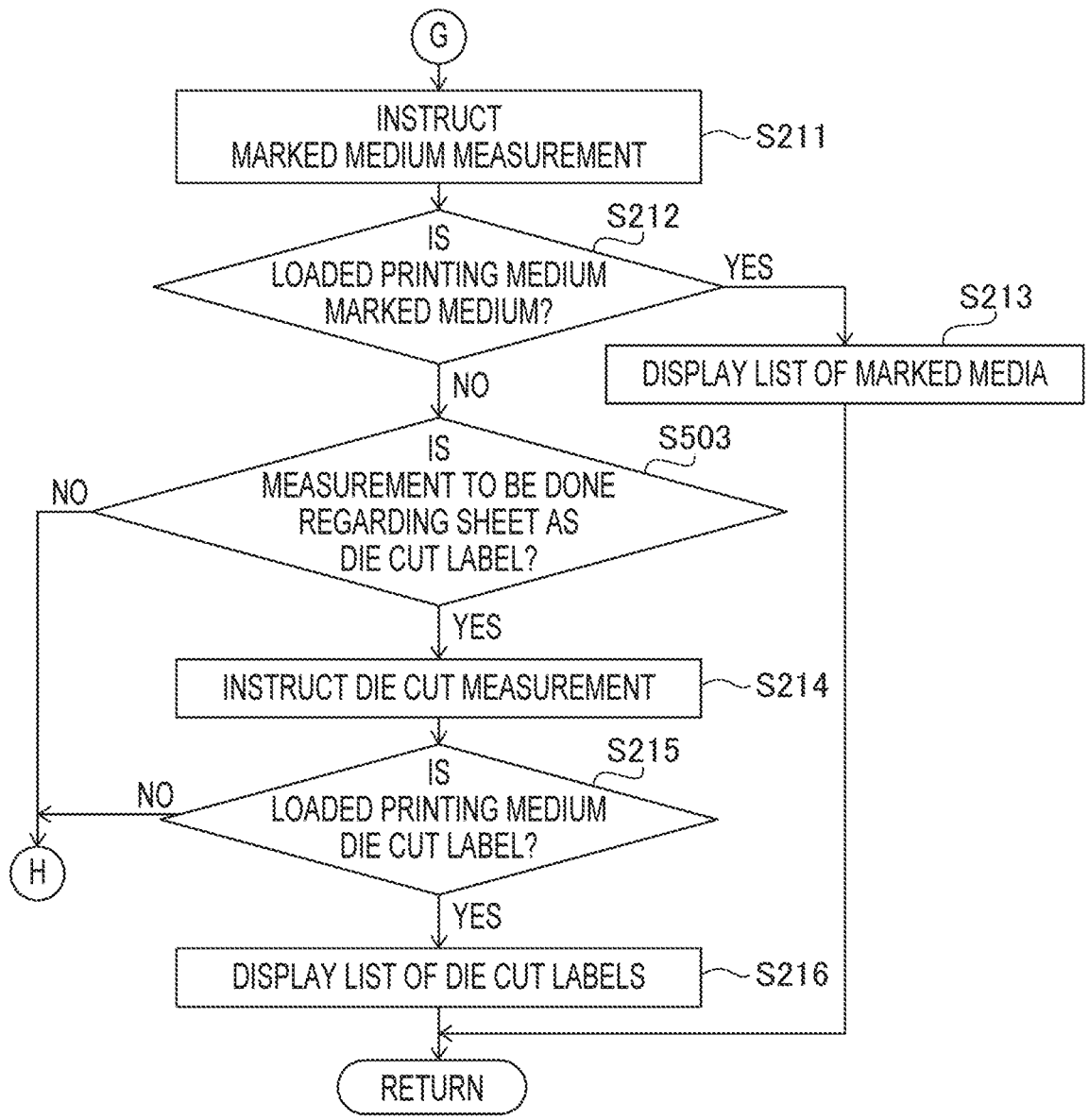

FIGS. 11A and 11B show a flowchart illustrating a length measurement process.

DETAILED DESCRIPTION OF THE EMBODIMENTS

Hereinafter, referring to the accompanying drawings, a first embodiment according to the present disclosures will be described in detail. A non-transitory computer-readable recording medium described below is configured to store computer-readable instructions which embody a program to be executed by a PC (e.g., a personal computer) connected to a printer which is configured to perform printing on a continuous belt-like printing medium (e.g., a continuous roll paper).

Figure 1:
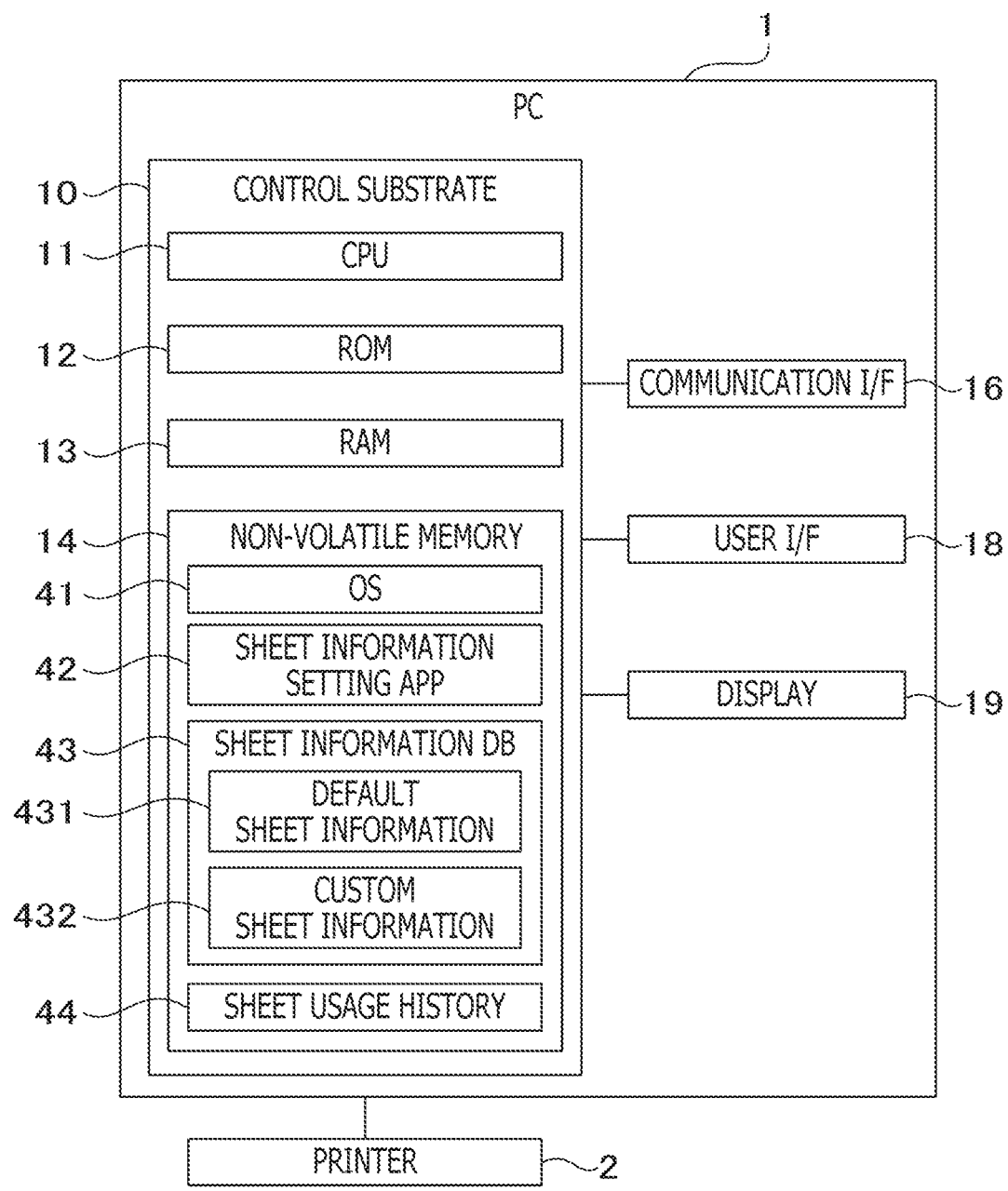
FIG. 1 is a block diagram of a PC according to a first embodiment of aspects of the present disclosures.

As shown in FIG. 1, a PC 1 according to the present embodiment is communicably connected to the printer 2. The PC 1 is configured to perform various processes to cause the printer 2 to perform printing. According to the present disclosures, the PC 1 is an example of an information processing apparatus. Instead of the PC 1, a smartphone, a tablet computer, and the like can be used as the information processing apparatus.

The printer 2 connected to the PC 1 will be described. FIG. 2A is a schematic plan view of the printer 2. FIG. 2B schematically shows a cross-sectional internal structure, taken along line X-X in FIG. 2A. The printer 2 according to the present embodiment is provided with a print head 21 employing a thermosensitive printing method and performing, with accommodating a printing medium 22 therein, printing of images on the printing medium 22 and conveyance of the recording medium 22 in parallel. The printing medium 22 used in the printer 2 is exchangeable. According to the present embodiment, as the printing medium 22, a roll sheet (a continuous belt-like sheet is rolled) is set to the printer 2.

In the following description, two directions (a conveying direction and a width direction) related to the printing medium 2 will be defined such that, as shown in FIG. 2A, a direction in which the printing medium 2 is conveyed inside the printer 2 will be referred to as the conveying direction (which is a right-left direction in FIG. 2B) and a direction perpendicular to the conveying direction and parallel to a plane of the printing medium 22 will be referred to as a width direction (which is a direction perpendicular to a plane of FIG. 2B). In the following description, the printing medium 22 may also be referred to as a "sheet."

The print head 21 has a plurality of heating elements arranged in the width direction. By selectively actuating the plurality of heating elements to generate heat, the printer 2 performs printing, in accordance with the thermosensitive printing method, on the printing medium 22, which is being conveyed, based on print data. The printing medium 22 is further conveyed such that a printed portion of the printing medium 22 protrudes outside from an ejection opening 23. The printer 2 is provided with a manual cutter 24 in the vicinity of the ejection opening 23. As the user operates the manual cutter 24, the portion of the printing medium 22 protruded outside the printer is cut off from the remaining portion of the printing medium 22 and is ejected from the printer 2.

As shown in FIG. 2C, the printing medium 22 used by the printer 2 is a label roll which includes a continuous belt-like release sheet 221 and a label sheet 222 adhered onto one side of the release sheet 221. The printing medium 22 includes a plurality of sheet types depending on shapes of the label sheet 222. Examples of the plurality of sheet types include a long tape, a die cut label and a marked medium.

The long tape is configured such that a continuous belt-like label sheet 222 is adhered onto one side of the continuous belt-like release sheet 221. By cutting the printed portion with the cutter 24 or the like, a label having a particular length is made from the long tape. It is noted that the "length" of the printing medium 22 in this specification is a size of the printing medium 22 in the conveying direction.

The die cut label is configured such that a plurality of label sheets 222 formed to have particular shapes are adhered onto one side of the continuous belt-like release sheet 221 at every particular interval in the conveying direction.

The marked medium is the printing medium 22 on which marks are formed at every particular interval in the conveying direction. The marks are in black and formed on a back surface of, for example, a light-colored release sheet 221, the back surface being a surface opposite to the surface where the label sheet 222 is adhered.

The printer 2 according to the present embodiment is provided with a transmission sensor 25 and a reflection sensor 26 to detect the printing medium 22, and a width sensor 27. The transmission sensor 25 is configured such that a light emitting element and a light receiving element area arranged to face each other with a conveying passage of the printing medium 22 being arranged therebetween. The reflection sensor 26 is configured such that a light emitting element and a light receiving element are arranged on the same side with respect to the conveying passage of the printing medium 22. The reflection sensor 26 is arranged to detect the back surface of the release sheet 221 of the printing medium 22.

The printer 2 is configured such that, by conveying and detecting the printing medium 22 loaded to the printer 2 with the transmission sensor 25 and the reflection sensor 26, cuing of the printing medium 22 is performed. Based on an output result of the transmission sensor 25, the printer 2 determines presence/absence of the label sheet 222 of the die cut label, and is capable of adjusting a leading end of the label sheet 222 to meet a position of the print head 21. Further, based on an output result of the reflection sensor 26, the printer 2 determines presence/absence of the mark of the marked medium, and is capable of adjusting a position of the mark to meet the position of the print head 21.

The width sensor 27 is a line sensor aligned in the width direction of the printing medium 22. The printer 2 is capable of obtaining a sheet width, which is a size of the loaded printing medium 22 in the width direction, based on an output result of the width sensor 27. It is noted that a printer of a model which is different from the printer 2 and does not have the width sensor 27 could be connected to the PC 1.

The printer 2 according to the present embodiment has a calibration function to obtain sheet information. The calibration function includes a function of measuring a sheet length, which is a sheet size in the conveying direction, with use of the transmission sensor 25 and the reflection sensor 26, and a function of detecting the sheet width, which is a sheet size in the width direction, with use of the width sensor. Further, the printer 2 is configured to receive a width measurement instruction instructing to measure only the sheet width, a designation measurement instruction designating a sheet type and instructing to measure the length of the designated sheet, and an automatic measurement instruction instructing to measure the length of the sheet without designating the sheet type.

When receiving the width measurement instruction, the printer 2 measures the sheet width, which is the size in the width direction of the printing medium 22 loaded to the printer 2, with use of the width sensor 27, and outputs the measurement result. When the sheet width is measured, the printer 2 does not convey the printing medium 22.

When receiving the designation measurement instruction, the printer performs different processes depending on the designated sheet types. When receiving the designation measurement instruction designating the die cut label, the printer obtains the output value of the transmission sensor 25 with conveying the printing medium 22 to detect a cut line of the label sheet 222. Then, based on the output value of the transmission sensor 25 and a conveying speed of the printing medium 22, the printer 2 measures the sheet length of the label sheet 222 of the printing medium 22 loaded to the printer 2, and outputs a measurement result. It is noted that, when the cut line of the label sheet 222 is not detected until the label sheet 222 is conveyed by a particular conveying distance, the printer 2 outputs information indicating that the printing medium 22 loaded to the printer 2 is not the die cut label. In the following description, the designation measurement instruction designating the die cut label will be referred to as a "die cut measurement instruction."

When receiving the designation measurement instruction designating the marked medium, the printer 2 obtains the output value of the reflection sensor 26 with conveying the printing medium 22 to detect marks formed on the back surface of the printing medium 22. Then, based on the output value of the reflection sensor 26 and the conveying speed of the printing medium 22, the printer measures a distance between adjacent marks formed on the printing medium 22 loaded to the printer 2, and output the measurement result. It is noted that, when no marks are detected until the printing medium 22 is conveyed by a particular conveying distance, the printer 2 outputs information indicating that the printing medium 22 is not the marked medium. In the following description, the designation measurement instruction designating the marked medium will be referred to as a "marked medium measurement instruction." It is noted that, according to the present embodiment, the conveying distance used to determine that the printing medium is not the die cut label is shorter than the conveying distance used to determine that the printing medium is not the marked medium.

When receiving the automatic measurement instruction, the printer 2 performs measurement of the die cut label and measurement of the marked medium in a particular order which is determined in advance. According to the present embodiment, the measurement of the die cut label is performed firstly. When it is determined that the printing medium is not the die cut label, the measurement of the marked medium is performed. When it is determined that the printing medium is not the marked medium, the printer 2 determines that the printing medium is the long tape. It is noted that the printer 2 according to the present embodiment does not perform the measurement of the die cut label and the measurement of the marked medium simultaneously.

Returning to FIG. 1, the PC 1 has a control substrate 10 which is provided with a CPU 11, a ROM 12, a RAM 13 and a non-volatile memory 14. Further, the PC 1 has a communication interface (I/F) 16, a user I/F 18 and a display 19, which are electrically connected to the control substrate 10. It is noted that the control substrate 10 shown in FIG. 1 is a generic name which may include hardware and software used to control the PC 1, but does not necessarily mean a single hardware existing in the PC 1.

The CPU 11 performs various processes in accordance with programs retrieved from the ROM 12 or the non-volatile memory 14 and/or based on operations by the user. The CPU 11 is an example of a computer or a controller. The ROM 12 stores a booting program to boot (to start up) the PC 1. The RAM 13 is used as a work area and/or a storage area to temporarily store data when the various processes are performed by the CPU 11. Example of the non-volatile memory 14 are an HDD, a flash memory, and the like, and used as a storage area storing various application programs (APPs), various pieces of data (e.g., image data, document data), and various settings. Each of the ROM 12, the RAM 13, and the non-volatile memory 14 is an example of a memory. When the CPU 11 is configured to have a CPU buffer, the CPU buffer is also regarded as an example of the memory.

An example of the memory may be a computer-readable storage medium, which is a non-transitory medium. The non-transitory medium may include, beside the above example, the recording medium such as a CD-ROM, a DVD-ROM, and the like. The non-transitory medium is also a tangible medium. In contrast, an electric signal carrying a program downloaded from a server on the Internet or the like is a computer-readable signal medium which is a kind of computer-readable medium, but is not fallen within the computer-readable storage (or recording) medium.

The communication I/F 16 includes hardware which is used to communicate with an external device such as the printer 2. The communication method of the communication I/F 16 can be either a wireless method or a wired method, and may be of any standards including Wi-Fi®, Bluetooth®, a USB, a LAN, and the like.

The user I/F 18 includes hardware, such as a keyboard and a mouse, configured to receive input operations by the user (hereinafter, occasionally referred to as a user input). The display 19 includes hardware configured to display information on a screen. It is noted that the PC 1 may include a touch panel or the like which has functions of both the user I/F 18 and the display 19.

The PC 1 according to the present embodiment has, as shown in FIG. 1, an operating system (OS) 41, a sheet information setting APP 42, a sheet information database (DB) 43, a sheet usage history 44 stored in the non-volatile memory 14. The sheet information setting APP 42 is configured to obtain information related to the printing medium 22 loaded to the printer 2, and edit the print setting to use the printing medium 22 as the printing medium 22 for use. The sheet information setting APP 42 is an example of a program realized by instructions stored in the non-transitory computer-readable recording medium.

The PC 1 is capable of transmitting a print instruction with designating the printer connected to the PC 1. Concretely, a printer driver installed in the PC 1 and printer information corresponding to the installed printer driver are registered with the OS 41. When the OS 41 receives the print instruction directed to the printer 2, the OS 41 instructs the printer driver corresponding to the printer 2 to print an image. When receiving the instruction to print the image, the printer driver generates print data using the sheet information included in the print setting and instructs the printer 2 to perform printing. The sheet information setting APP 42 is a program which is used to edit the print setting used by the printer driver. The sheet information setting APP 42 is executed, for example, by a user who has exchanged the printing medium 22 loaded to the printer 2. The sheet information setting APP 42 obtains information regarding the new printing medium 22 and receives instruction to update the print setting.

The information regarding the printing medium 22 includes, for example, the sheet type and the sheet sizes in the conveying and width directions. The sheet type is information indicating a type of the printing medium 22 and indicates one of the long tape, the die cut label and the marked medium, according to the present embodiment. The sheet size in the conveying direction is set in accordance with the user instruction when the sheet type is the long tape. When the sheet type is the die cut label or the marked medium, the sheet size in the conveying direction is determined based on the size of the label sheet 222 or the distance between the marks. It is noted that, when the sheet type is the long tape, the sheet size in the conveying direction may not be set. The sheet size in the width direction is the size of the label sheet 222 in the width direction regardless of the sheet type.

The sheet information DB 43 is configured to store the sheet information of each of the sheets used by the printer 2. The sheet information DB 43 contains, for example, default sheet information 431 which is provided by a vender of the printer 2 (i.e., the vender of the printer driver) and custom sheet information 432 which is set based on the user instruction. The custom sheet information 432 is sheet data including information regarding user-defined sheet sizes. The custom sheet information 432 is an example of custom sheet data. Based on the user selection, the PC 1 may update the sheet information included in the print setting using one piece of the sheet information stored in the sheet information DB 43.

The sheet usage history 44 is history of sheet information included in the print setting used in the print job, which is transmitted from the PC 1 to the printer 2. The sheet usage history 44 includes, for example, a current setting which is the print setting used in the latest print job and is the print setting currently used in printing by the printer 2. It is noted that the current setting is the sheet information included in the current print setting.

Next, processes performed by the sheet information setting APP 42 will be described. It is noted that each process described below and each step of flowcharts described below are basically performed by the CPU 11 executing respective programs, or instructions stored in the non-transitory computer-readable recording medium. Accordingly, processes of "judging," "extracting," "selecting," "calculating," "determining," "identifying," "obtaining," "receiving," "controlling," and the like are processes performed by the CPU 11. It is noted that the processes performed by the CPU 11 include a hardware control using an API of the OS 41 of the PC 1.

In the description of the present specification, description of the OS 41 is omitted when describing operations according to respective programs. That is, in the following description, an expression "program B controls hardware C" may be interpreted as "program B controls hardware C using the API of the OS 41." Further, a process of the CPU 11 in accordance with instructions described in a program may be expressed in a simplified manner. For example, expressions such as "the CPU 11 performs . . . ," or "the program performs . . . " may be used.

The term "obtain" is used to mean a concept which does not necessarily include "requirement." That is, a process that the CPU 11 receives data without requesting the same is included in a concept that "the CPU 11 obtains data." In the specification, the term "data" is represented by a bit string which is readable by the computer. Multiple pieces of data having substantially the same meaning but respectively have different formats will be treated as "the same data." So is the term "information." Further, "to request" and "to instruct" are concepts of outputting information indicating "requesting" and "instruction" to a destination. Information indicating "requesting" or "instructing" may be described as "request" or "instruction."

A process by the CPU 11 to determine whether or not information A indicates a fact B may be conceptually described as "determine whether or not the fact B is true based on information A." Further, a process of determining, by the CPU 11, whether information A indicates the fact B or the fact C may be conceptually expressed such that the CPU determines whether the fact B or the fact C is true based on the information A."

Firstly, an automatic setting process will be described referring to a flowchart shown in FIG. 3. The automatic setting process is performed when the sheet information setting APP 42 receives an automatic setting instruction. It is noted that the sheet information setting APP 42 according to the present embodiment is configured to receive the automatic setting instruction, which is the sheet setting instruction without designating the sheet type, and a type-designated setting process, which is the sheet setting process with designating the sheet type. The type-designated setting instruction is input by the user who knows the sheet type of the sheet currently loaded to the printer 2 (i.e., after the sheet has been exchanged) with designation of the sheet type. The automatic setting process is performed by the CPU 11 of the PC 1 in response to the sheet information setting APP 42 receiving the automatic setting instruction. The automatic setting instruction received by the sheet information setting APP 42 is an example of a measurement instruction, and a process of receiving the automatic setting instruction is an example of a measurement instruction receiving process. It is noted that the sheet information setting APP 42 is called by the printer driver. In addition, there are cases where the sheet information setting APP 42 is called in response to an operation of icon of the sheet information setting APP 42 displayed by the OS 41 on the display 19.

When the automatic setting process is started, firstly, a selection list 430 is generated (S101). The selection list 430 is a list of candidates of the sheet information for the user to select information of the printing medium 22 currently loaded to the printer 2. The selection list 430 includes a plurality of pieces of sheet information corresponding to the candidates of the sheet information, respectively. According to the present embodiment, all the pieces of sheet information included in the sheet information DB 43 (as shown in FIG. 4A) or all the pieces of sheet information included in the custom sheet information 432 are included in the selection list 430. Optionally, the selection list 430 may include the sheet information included in the sheet usage history 44 or the sheet information of the current print setting in addition to the above. Further, when the sheet information setting APP 42 is configured to receive a setting of favorite sheet information, the selection list 430 may also include the sheet information set to the favorite sheet information.

It is noted that, in FIGS. 4A, 4B1-4B4, an indication "W1 mm (LONG)" denotes a sheet of which width is W1 mm, of which length is not designated and of which sheet type is the long tape. Further, an indication "W1 mm×L1 mm (DIE CUT)" denotes a sheet of which width is W1 mm, of which length is L1 mm and of which sheet type is the die cut label. Furthermore, an indication "W3 mm×L2 mm (MARKED MEDIUM)" denotes a sheet of which width is W3 mm, of which length is L2 mm and of which sheet type is the marked medium. The other indications respectively denote the widths, the lengths and the sheet types, similarly.

Next, the CPU 11 obtains the model information of the printer (S102). When, for example, the sheet information setting APP 42 is called by the printer driver, the CPU 11 obtains the model information of the printer registered with the OS 41 in correspondence with the called printer driver. In this case, the CPU 11 obtains the model information by inquiring the OS 41 or by retrieving registered information. When the sheet information setting APP 42 is started in response to the user operation of an icon, the CPU 11 obtains the model information of the printer, which is set to the OS 41 as a normally used printer for printing. In this case, the CPU 11 may display a list of printers registered in correspondence with the printer driver and obtain the model information of the selected one of the printers selected by the user via the user I/F 18. Alternatively, the CPU 11 may display a list of the models of the printers and obtain the model information selected by the user via the user I/F 18. Thereafter, the CPU 11 determines whether the printer has a width sensor based on the obtained model information (S103).

When it is determined that the width sensor is provided to the printer (S103: YES), the CPU 11 transmits the width measurement instruction to the printer through the communication I/F 16 (S104). It is noted that the process in S104 is an example of a first transmission process, and the instruction transmitted in S104 is an example of a first request. When the printer is provided with the width sensor, the sheet width of the printing medium loaded to the printer can be obtained with use of the width sensor. Since the printer 2 according to the present embodiment is provided with the width sensor, when the printer 2 is the currently selected printer, the CPU 11 makes a positive determination (S103: YES).

In response to the width measurement instruction transmitted in S104, the printer measures the sheet width, and the measured result (i.e., the measured sheet width) to the PC 1. Thus, the CPU 11 obtains the sheet width information from the printer in S105. It is noted that the measurement of the sheet width in the printer is an example of a first measurement, and the sheet width information output by the printer is an example of a first measurement result.

The CPU 11 attempts, in S106, to extract the sheet information of sheets each corresponding to a width range which meets the obtained sheet width from the selection list generated in S101. It is noted that a process in S106 is an example of an extraction process. When, for example, the selection list 430 includes the sheet information as shown in FIG. 4A and the obtained sheet width is W2 mm, the sheet information corresponding to the sheet width of W2 mm as shown in FIG. 4B1 is extracted. The width range which meets the obtained sheet width may be only the width identical to the obtained sheet width, or a range including the obtained sheet width with an allowable errors. The allowable range may be, for example, a range of ±1 mm or ±10%. Next, the CPU 11 determines whether one or more pieces of sheet information are extracted (S107).

When it is determined that he sheet information has been extracted (S107: YES), the CPU 11 displays a list of the extracted sheet information on the display 19 (S108), and waits for receipt of the user selection of the sheet information through the user I/F 18. By narrowing down the candidates of the sheet information based on the sheet width information, it becomes easier for the user to select the sheet information. In S109, the CPU 11 determines whether the user selection is received. It is noted that a process of S109 is an example of a first setting reception process. When it is determined that the selection has been received (S109: YES), the CPU 11 updates the print setting such that the selected sheet information as that of the print setting (S110), and the CPU 11 terminates the automatic setting process. A process of S110 is an example of a first setting process.

When it is determined that the user selection has not been received (S109: NO), the CPU 11 determines whether a cancellation instruction has been received (S111). The cancelation instruction is to terminate setting of the sheet information and to terminate the automatic setting process. When, for example, the user noticed that the currently loaded sheet is different from the desired printing medium 22 based on the sheet width information, the user can cancel the automatic setting process. When it is determined that the cancellation instruction has been received (S111: YES), the CPU 11 and terminates the automatic setting process without updating the print setting.

When it is determined that the width sensor is not provided to the printer (S103: NO), when it is determined that no sheet information that matches the measured width is extracted from the selection list 430 (S107: NO), or when it is determined that the cancellation instruction is not received (S111: NO), the CPU 11 executes a detail measurement process (S112). When the user can select no sheet information from the displayed list of candidates and wishes to obtain detailed information, the user does not input the cancellation instruction.

It is noted that the CPU 11 may inquire whether the user wishes that the detailed measurement is to be performed, and receive a detail measurement instruction. Alternatively, when no selection instruction or cancellation instruction is received within a particular standby time period after the inquiry by the CPU 11, the CPU 11 may proceed to perform a detail measurement process. Further, when the width sensor is not provided to the printer or when the sheet information cannot be extracted based on the width information, the CPU 11 may display a message explaining such a status and wait for receipt of the cancellation instruction.

The detail measurement process will be described referring to a flowchart shown in FIGS. 5A and 5B. In the detail measurement process, the CPU 11 determines whether the sheet information of the current print setting is included in the selection list 430 (S201). The sheet information of the current print setting is information of the printing medium 22 which has been used by the user just previously. The selection list 430 which is subjected to determination in S201 is, for example the selection list 430 which is displayed in S108 of the automatic setting process. It is noted that, when extraction of the list is failed (S107: NO), the selection list 430 generated in S101 may be used or the process is performed from S202 with skipping the determination step of S201.

When it is determined that the sheet information of the current print setting is included in the selection list 430 (S201: YES), the CPU 11 determines whether the sheet of the current print setting is the die cut label (S202). When it is determined that the sheet of the current print setting is not the die cut label (S202: NO), the CPU 11 determines whether the sheet of the current print setting is the marked medium (S203). When it is determined that the sheet of the current print setting is not the marked medium (S203: NO), the CPU 11 determines whether the die cut label is included in the selection list 430 (S204). The selection list 430 subjected to the determination in S204 is the same as that subjected to the determination in S201.

When it is determined that the sheet of the current print setting is the die cut label (S202: YES), or when it is determined that the die cut label is included in the selection list 430 (S204: YES), the CPU 11 transmits the die cut measurement instruction to the printer (S205) and receives the measurement result from the printer. The process of S205 is an example of a second transmission process or a measurement request transmission process, and the die cut measurement instruction transmitted in S205 is an example of a second request or a measurement request.

The printer performs measurement of the sheet length of the sheet of the designated sheet type based on the request transmitted from the PC 1, and outputs the information of the measurement result. The measurement of the sheet length performed in the printer is an example of a second measurement or a particular sheet type measurement. Further, information output from the printer as a result of the second measurement or the particular sheet type measurement is an example of a second measurement result or a measurement result. Then, the CPU 11 determines whether the sheet length is obtained as the sheet is the die cut label based on the information received from the printer (S206).

Figure 2:
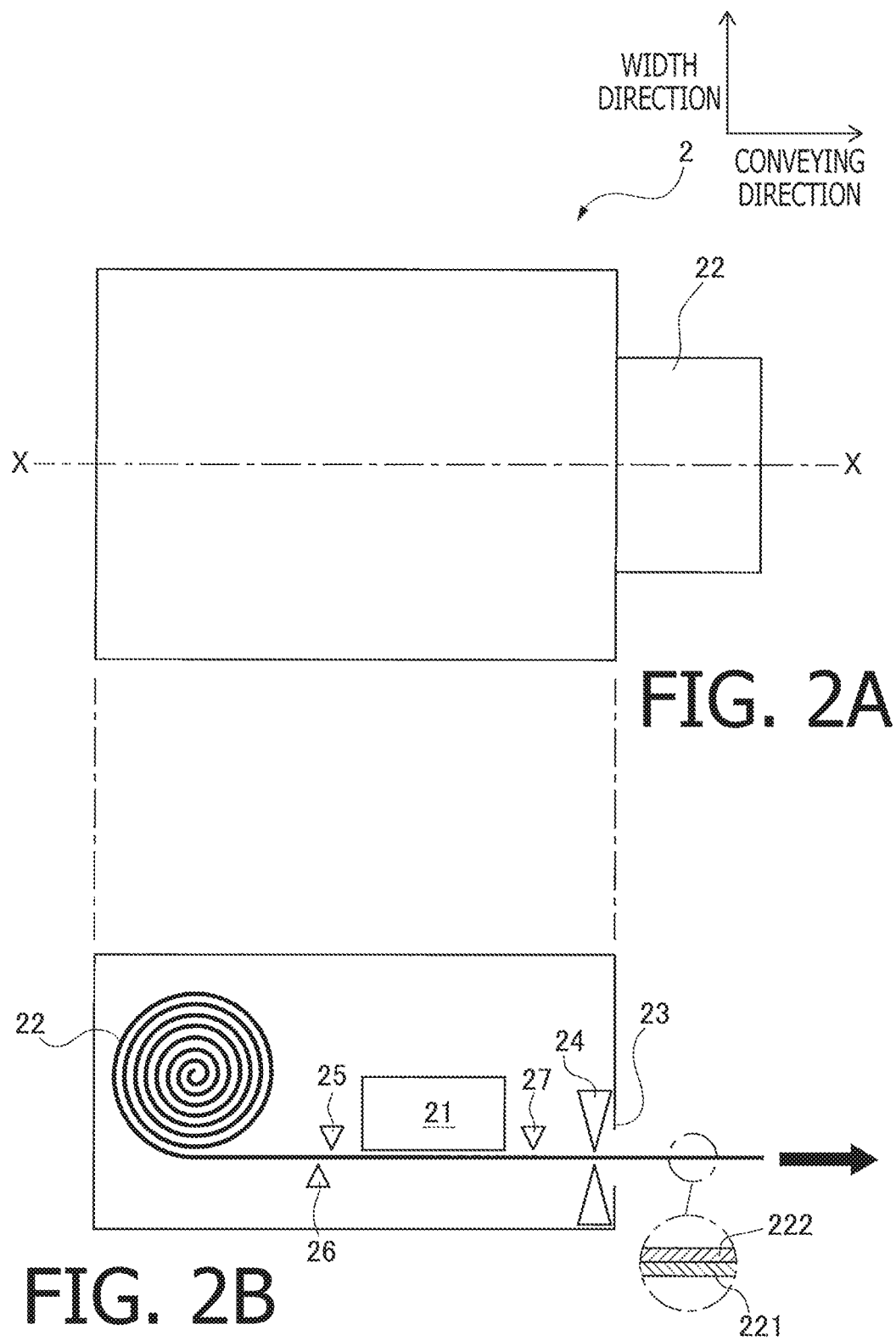
FIG. 2A is a plan view of a printer.
FIG. 2B is a cross-sectional side view, taken along line X-X in FIG. 2A, schematically showing an inner configuration of the printer.
FIG. 2C is an enlarged sectional side view of a printing medium.

When it is determined that the sheet length is obtained (S206: YES), the CPU 11 displays, on the display 19, a list of the die cut labels fallen within a rage that meets the sheet lengths obtained from the sheet information included in the selection list 430 (S207). When, for example, the obtained sheet length is L3 mm, the sheet information of the die cut label of which sheet length is L3 mm is extracted and displayed as shown in FIG. 4B2.

When the sheet length is not obtained and it is determined that the sheet is not the die cut label (S206: NO), the CPU 11 transmits the marked medium measurement instruction to the printer (S208) and receives the measurement result from the printer. Then, based on the information received from the printer, the CPU 11 determines whether the sheet length is obtained regarding the sheet as the marked medium (S209). When it is determined that the sheet length is obtained (S209: YES), the CPU 11 extracts, from the selection list 430, and displays, on the display 19, a list of the marked media having sheet lengths which match the obtained sheet length among the sheet information included in the selection list 430 (S210). When, for example the obtained sheet length is L1 mm, sheet information of the marked medium having the sheet length L1 mm is extracted from the selection list 430 and displayed, as shown in FIG. 4B3, on the display 19.

When it is determined that the sheet of the current print setting is the marked medium (S203: YES), or it is determined that the die cut label is not included in the selection list 430 (S204: NO), the CPU 11 transmits the marked medium measurement instruction to the printer (S211), and receives the measurement result from the printer. A process of S211 is an example of a second transmission process or a measurement request transmission process. The marked medium measurement instruction transmitted in S211 is an example of a second request or a measurement request. Then, based on the information received from the printer, the CPU 11 determines whether the sheet length is obtained regarding the sheet as the marked medium (S212).

When it is determined that the sheet length is obtained (S212: YES), the CPU 11 extracts information, from among the sheet information included in the selection list 430, of the marked media having sheet lengths which meet the obtained sheet length (S213).

When the sheet length has not been obtained and it is determined that the sheet is not the marked medium (S212: NO), the CPU 11 transmits the die cut measurement instruction to the printer (S214) and determines whether the sheet length is obtained regarding the sheet as the die cut label (S215). When it is determined that the sheet length has been obtained (S215: YES), the CPU 11 extracts information, from the sheet information included in the selection list 430, of the die cut labels having sheet lengths which meet the obtained sheet length and displays the same on the display 19 (S216).

When it is determined that the sheet length has not been obtained in response to the die cut measurement instruction or the marked medium measurement instruction (S209: NO or S215: NO), the CPU 11 determines that the sheet is the long tape, extracts the sheet information of the long tape from among the sheet information included in the selection list 430, and displays the list of long tapes on the display 19 (S217). In such a case, as shown in FIG. 4B4 for example, the sheet information in which the sheet type is designated to be the long tape is extracted from the selection list 430 and a list of the long tapes is displayed on the display 19. It is noted that there are two settings for the long tapes, one of which is a fixed length setting designating the sheet width and the sheet length, and the other of which is an unfixed length setting designating only the sheet width. It is noted that, in a process of S217, all the long tapes of which sheet widths are fallen within a range which meets the obtained sheet width are displayed.

As described above, in the PC 1 according to the present embodiment, when the current setting is the die cut label, the CPU 11 performs the die cut measurement firstly, while when the current setting is the marked medium, the CPU 11 performs the marked medium measurement firstly. It is likely that the printing medium same as the currently used one is to be used for the subsequent printing. Therefore, by performing the measurement with respect to the sheet type same as that of the current setting initially, it is likely that the other measurements will not be performed. Accordingly, the conveying amount of the printing medium 22 can be suppressed.

It is noted that, in S207, S210, S213, S216 and S217, the CPU 11 displays a list and further buttons to receive an instruction to display the measurement results and set the same as new sheets. For example, when a sheet which has never been used in the past or which is not a default sheet is loaded to the printer, it is likely that the sheet is not included in the selection list 430 generated in S101 of the automatic setting process. It is noted that the CPU 11 can change such new sheet information to the print setting in accordance with a user instruction. After one of S207, S210, S213, S216 and S217, the CPU 11 terminates the detail measurement process and the process returns to the automatic setting process.

Figure 3:
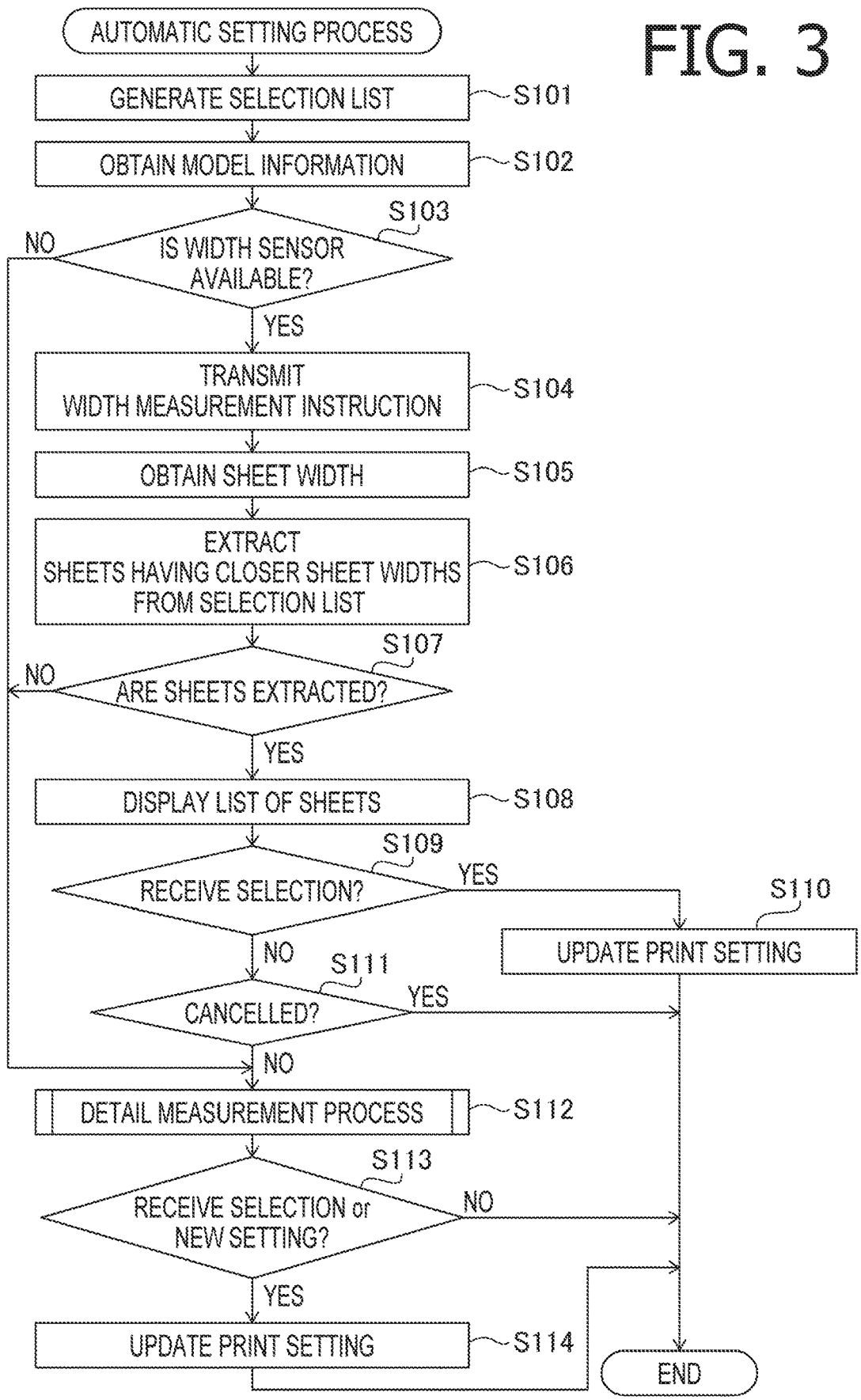
FIG. 3 is a flowchart illustrating an automatic setting process according to the first embodiment of the present disclosures.

Returning to description on the automatic setting process in FIG. 3, after execution of the detail measurement process in S112, the CPU 11 determines whether or not the sheet information is selected from the displayed list or an instruction to create a new print setting is received (S113). When it is determined that the sheet information is selected from the displayed list or the instruction to create a new print setting is received (S113: YES), the CPU 11 updates the print setting by using the selected sheet information or the sheet information created in accordance with the setting instruction as the sheet information of the print setting (S114), and terminates the automatic setting process. It is noted that the process of S114 when the print setting is updated based on the selected sheet information is an example of a second setting process or a setting process.

When it is determined that the sheet information selected from the displayed list or the instruction to create the new print setting is not received (S113: NO), that is, when a cancellation instruction is received, the CPU 11 terminates the automatic setting process without setting the sheet information.

Next, a type-designated setting process will be described referring to a flowchart shown in FIG. 6. The type-designated setting process is performed when the sheet information setting APP 42 receives a type-designated setting instruction which is a sheet setting instruction designating the sheet type. The type-designated setting process is performed by the CPU 11 when the sheet information setting APP 42 receives the type-designated setting instruction. In the description on FIG. 6, to the processes same as those in the automatic setting process shown in FIG. 3, the same step numbers are assigned and explanations thereof will be omitted. The type-designated setting instruction received by the sheet information setting APP 42 is an example of a measurement instruction, and the process of receiving the type-designated setting instruction is an example of the measurement instruction receiving process.

In the type-designated setting process, the CPU 11 firstly generates the selection list 430 (S101). Then, the CPU 11 determines whether the sheet type designated when the type-designated setting process is started is the long tape (S301). When it is determined that the long tape has been designated (S301: YES), the CPU 11 obtains the model information (S102) and determines whether the target printer is provided with the width sensor (S103).

When it is determined that the width sensor is provided to the target printer (S103: YES), the CPU 11 transmits the width measurement instruction to the printer (S104), and obtains the sheet width information from the printer (S105). Further, the CPU 11 attempts to extract, from the selection list 430, sheet information of which sheet widths meet the obtained sheet width (S106), and determines whether or not one or more pieces of sheet information have been extracted (S107).

When it is determined that the sheet information has been extracted (S107: YES), the CPU 11 displays a list of the extracted sheet information on the display 19 (S108), and determines whether the user selection is received (S109). When it is determined that the user selection is received (S109: YES), the CPU 11 set the selected sheet information as the updated sheet information of the print setting (S110) and terminates the type-designated setting process.

When it is determined that the printer is not provided with the width sensor (S104: NO), the CPU 11 extracts the sheet information of the long tapes from the selection list 430, displays a list of the extracted sheet information (S302), and receives the user selection. When the printing medium is the long tape, only the sheet width is subjected to the measurement. When the printer does not have the width sensor, the printer cannot measure the sheet width. Therefore, the CPU 11 determines whether the user selection has been made from among all the long tapes included in the selection list (S303). When it is determined that the user selection has been received (S303: YES), the CPU 11 updates the print setting by using the selected sheet information as the updated sheet information (S110) and terminates the type-designated setting process.

When it is determined that the sheet information has not been extracted (S107: NO) or it is determined that no selection has been received (S109: NO), the CPU 11 displays a message asking whether the user wishes to set the sheet loaded to the printer as a sheet having the sheet width obtained in S105, and determines whether the user instruction to set the loaded sheet as the new sheet is received (S304). When it is determined that the user instruction to set the loaded sheet as the new sheet is received (S304: YES), the CPU 11 updates the print setting by setting the long tape having the sheet width obtained in the S105 (S110) and terminates the type-designated setting process.

When it is determined that no selection has been made from the list displayed in S302 (S303: NO), or when it is determined that no instruction to set the loaded sheet as the new sheet has been received (S304: NO), the CPU 11 does not update the print setting and terminates the type-designated setting process.

When the sheet type designated by the type-designated setting instruction is the printing medium other than the long tape (i.e., when the die cut label or the marked medium is designated) (S301: NO), the CPU 11 performs a non-long sheet setting process (S305).

The non-long sheet setting process will be described referring to a flowchart shown in FIG. 7. In the description regarding FIG. 7, steps same as those in the automatic setting process shown in FIG. 3 are assigned with the same step numbers and description thereof will be omitted.

When the printing medium other than the long tape is designated, the CPU 11 obtains the model information (S102) and determines whether the width sensor is provided to the printer (S103). When it is determined that the width sensor is provided to the printer (S103: YES), the CPU 11 transmits the width measurement instruction to the printer (S104), and obtains the sheet width information from the printer (S105). Further, the CPU 11 attempts to extract the sheet information of the printing media having the sheet widths which meet the obtained sheet width (S106), and determines whether or not one or more pieces sheet information are extracted (S107).

When it is determined that the sheet information has been extracted (S107: YES), the CPU 11 displays a list of the extracted pieces of the sheet information on the display 19 (S108), and determines whether the user selection is received (S109). When it is determined that the user selection has been received (S109: YES), the CPU 11 updates the print setting by updating the selected sheet information of the print setting (S110). Then, the CPU 11 terminates the non-long sheet setting process and returns to the type-designated setting process.

When it is determined that the user selection has not been received (S109: NO), the CPU 11 determines whether the cancellation instruction is received (S111). When it is determined that the printer is not provided with the width sensor (S103: NO), when it is determined that the sheet information has not been extracted (S107: NO), or when it is determined that the cancellation instruction has not been received (S111: NO), the CPU 11 performs the type-designated detail measurement process (S401).

The type-designated detail measurement process will be described referring to a flowchart shown in FIGS. 8A and 8B. In the description regarding FIGS. 8A and 8B, steps same as those in the automatic setting process shown in FIGS. 5A and 5B are assigned with the same step numbers and description thereof will be omitted.

In the detail measurement process, the CPU 11 firstly determines whether the sheet type designated when the detail measurement process is started is the die cut label (S501). When it is determined that the die cut label has been designated (S501: YES), the CPU 11 transmits the die cut measurement instruction to the printer (S205), and determines whether the sheet length is obtained (S206). When it is determined that the sheet length has been obtained (S206: YES), the CPU 11 displays a list of the die cut labels of which lengths fall within a range that meets the obtained sheet length (S207).

When it is determined that the printing medium loaded to the printer is not the die cut label (S206: NO), the CPU 11 displays a message inquiring the sheet type on the display 19. Then, based on the user input, the CPU 11 determines whether the measurement is to be performed regarding the printing sheet as the marked medium (S502). That is, even if the die cut label is designated, when it is determined that the printing medium is not the die cut label, the CPU 11 checks the user's intention as to further measurement is to be performed or not.

When the marked printing medium measurement instruction is transmitted to the printer, the printer performs a calibration function of detecting the marks with conveying the sheet. It is highly possible that a user who has designated the die cut label and started the type-designated setting process intends to use the die cut label. Therefore, by displaying that the loaded printing medium is not the die cut label and checking the user's intention to proceed before transmitting the marked medium measurement instruction, unnecessary conveyance of the sheet can be suppressed. It is noted that, since the sheet type is not designated in the automatic setting process described above, when it is determined that the loaded printing medium is not the die cut label, the CPU 11 automatically transmits the marked medium measurement instruction as shown in FIGS. 5A and 5B. As above, various measurement instructions are automatically transmitted until the sheet until the sheet type is determined, the CPU 11 can obtain detailed information automatically.

When it is determined that measurement is performed regarding the printing medium as the marked medium (S502: YES), the CPU 11 transmits the marked measurement instruction to the printer (S208), and determines whether the sheet length is obtained (S209). When it is determined that the sheet length is obtained (S209: YES), the CPU 11 extracts, from the selection list 430, the marked media having the sheet lengths which meet the obtained sheet length and displays a list of the same on the display 19 (S210).

When it is determined that the designated sheet type is not the die cut label (S501: NO), the CPU 11 transmits the marked medium measurement instruction to the printer (S211), and determines whether the sheet length is obtained (S212). When it is determined that the sheet length is obtained (S212: YES), the CPU 11 extracts, from the selection list 430, the marked media having the sheet lengths which meet the obtained sheet length and displays a list of the same on the display 19 (S213).

When it is determined that the printing medium loaded to the printer is not the marked medium (S212: NO), the CPU 11 displays a message inquiring the sheet type on the display 19. Then, based on the user input, the CPU 11 determines whether the measurement is performed regarding the printing sheet as the die cut label (S503). When it is determined that the measurement is performed regarding the printing medium as the die cut label (S503: YES), the CPU 11 transmits the die cut measurement instruction to the printer (S214), and determines whether the sheet length is obtained (S215). When it is determined that the sheet length is obtained (S215: YES), the CPU 11 extracts, from the selection list 430, the die cut labels having the sheet lengths which meet the obtained sheet length and displays a list of the same on the display 19 (S216).

After displaying the list in S207, S210, S213 or S216, the CPU 11 terminates the detail measurement process and returns to the non-long sheet setting process. On the other hand, when it is determined that measurement in accordance with the designated sheet type is not to be performed (S502: NO, or S503: NO), or the sheet length cannot be obtained in any of the measurements (S209: NO, or S210: NO), the CPU 11 returns unavailability information indicating no suitable sheet information is available (S504), terminates the detail measurement process, and returns to the non-long sheet setting process.

Returning to description on the non-long sheet setting process shown in FIG. 7, after terminating the detail measurement process in S401, the CPU 11 determines whether the unavailability information is received (S402). When it is determined that the unavailability information has not been received (S402: NO), the CPU 11 determines whether selection of the sheet information from the list displayed in the non-long sheet setting process or an instruction for new setting is received (S113). When it is determined that the selection of setting instruction is received (S113: YES), the CPU 11 sets the selected sheet information or the sheet information instructed to set as the sheet information of the print setting (S114), and terminates the non-long sheet setting process.

When it is determined that the cancellation is received (S111: YES, or S113: NO), or when it is determined that the unavailable information is received (S402: YES), the CPU 11 terminates the non-long sheet setting process without setting the sheet information, and returns to the type-designated setting process. After terminating the non-long sheet setting process in S305, the type-designated setting process is terminated.

When the sheet type other than the long tape is designated and the type-designated setting process is started, and thereafter, it is determined that a matching sheet type is not available in S402, if the printer is provided with the width sensor and the sheet width has been obtained, the CPU 11 may ask the user whether the long tape having the obtained sheet width is to be set as the printing medium. Further, if an instruction to such a setting is received, the CPU 11 updates the print setting by setting the sheet type to the long tape, of which sheet length is unfixed.

As described in detail above, by executing the sheet information setting APP 42 according to the first embodiment, the PC 1 performs measurement of the sheet width which does not require feeding of the sheet when the measurement instruction of the sheet size, extracts the sheet information including the width range that meets the measurement result from the selection information DB 43. Further, when the user inputs the setting instruction with respect to the sheet information from among the extracted pieces of the sheet information, the CPU 11 sets the sheet information selected by the user as the sheet information representing the sheet size to be used for printing. In this case, since the measurement of the sheet length by the printer is not performed, the sheet is not fed and it is possible to avoid waste of the sheet. Further, since it is necessary to take time to measure the length of the sheet, by avoiding the measurement of the sheet length, the measurement time can be shortened.

Further, according to the automatic setting process, when the sheet information cannot be set by performing only the measurement of the sheet width, the CPU 11 causes the printer to perform measuring the sheet length with designating the sheet types. The PC 1 is capable of transmitting the measurement instruction by a plurality of time with varying the sheet types. Since the measurement of the sheet length according to the current setting, the selection list 430 and the sheet type designated by the user is performed in a prioritized manner, it is highly possible that the sheet length can be obtained only by a single measurement and measurements according to the other sheet types are unnecessary, increase of the sheet feeding amount for the measurement of the sheet length can be suppressed.

For example, when the selection list 430 is generated by limiting the sheet information to be fallen within the user-defined custom sheet information 432 or the sheet information included in the sheet usage history 44, the sheet length can be measured with priority given to the sheet types suitable for the user's usage condition. On the other hand, when the sheet length is not obtained for the sheet types previously set, the measurement is automatically performed with a different sheet type. Therefore, it is likely that the sheet type can be determined. When the sheet length is not obtained by the measurement with the sheet types previously set, a list of the sheet information in connection with the sheet types other than the previously set may be displayed.

In the type-designated setting process according to the present embodiment, when the sheet length has not been obtained according to the user-designated sheet type, the user's intention as to whether the measurement in accordance with the other sheet types may be confirmed. Therefore, unnecessary measurement (i.e., the measurements the user does not intend) can be avoided. Further, when the measurement according to the other sheet types, it is likely that the sheet type can be determined. It may be configured that an instruction to perform detail measurement with designating the sheet type is received when the selection has not been received in S109 after the sheet width has been obtained in the automatic setting process.

Next, a second embodiment according to the present disclosures will be described. In the second embodiment, a printer 200 configured to perform printing on a roll sheet which is a continuous belt-like printing medium will be described in detail.

As shown in FIG. 9, the printer 200 includes a control substrate 210 provided with a CPU 211, a ROM 212, a RAM 213, and a non-volatile memory 214. The printer 200 further includes a communication I/F 216, a user I/F 218, a display 219, a print head 21, a transmission sensor 225, a reflection sensor 226 and a width sensor 227, which are electrically connected to the control substrate 210. It is noted that the control substrate 210 shown in FIG. 9 is merely are collective name including hardware and software used to control the printer 200 but not indicating a single hardware existing in the printer 200.

The print head 21, the sensors 225-227 are of the same configurations as those provided to the printer 2 according to the first embodiment. Further, the printer 200 has the printing function and various measurement functions as in the printer 2 according to the first embodiment.

The printer 200 has a sheet information setting program 242 and a sheet information DB 243 in the non-volatile memory 214 as shown in FIG. 9. The sheet information setting program 242 is for obtaining information regarding the printing medium loaded to the printer 200 and editing the print setting so that the printing medium loaded to the printer 200 can be used as the sheet for printing.

The printer 200 has functions of receiving a print instruction by the user, and printing of an image based on, for example, character strings received through the user I/F 218 and image data received, for example, through the communication I/F 216, independently. When the printing is performed independently, the printer 200 uses the print setting edited by the sheet information setting program 242. The sheet information DB 243 is configured to store sheet information of various sheets which can be used by the printer 200 for printing. The sheet information DB 243 stores, for example, default sheet information provided by a vender of the printer 200 and sheet information of the sheets used by the printer 200 in the past.

Referring to a flowchart shown in FIG. 10, a main body setting process, which is performed when a sheet setting instruction is received in accordance with the sheet information setting program 242 will be described. The printer 200 executes the sheet information setting program 242 when, for example, the printer 200 is powered ON, or when an opening/closing of an insertion port of a printing medium 22 is detected, and receives the sheet information setting instruction. It is noted that a process of receiving the setting instruction is an example of a measurement instruction receiving process.

In the main body setting process, the CPU 211 firstly obtains the sheet width information which is a measurement result output by the width sensor (S601). It is noted that the process of S601 is an example of a width measurement process. Then, referring to the sheet information DB 243, the CPU 211 attempts to extract sheet information corresponding to the sheets of which widths are fallen with in a rage that meets the obtained sheet width (S602). It is noted that the process of S602 is an example of an extraction process. The CPU 211 may extract the sheet information from among all the pieces of sheet information stored in the sheet information DB 243 or extract the sheet information from previously used pieces of the sheet information.

Then, the CPU 211 determines whether the sheet information has been extracted (S603). When it is determined that the sheet information has been extracted (S603: YES), the CPU 211 displays a list of the extracted sheet information (S604) and receives a user selection. In S605, the CPU 211 determines whether the user selection has been received. It is noted that a process of S605 is an example of a first setting receiving process.

When it is determined that the user selection is received (S605: YES), the CPU 211 updates the print setting by setting the selected sheet information to the sheet information of the print setting (S606) and terminates the main body setting process. It is noted that the process of S606 is an example of a first setting process.

When it is determined that the user selection has not been received (S605: NO), the CPU 211 determines whether the cancellation instruction has been received (S607). When it is determined that the sheet information has not been extracted (S603: NO), or the cancellation instruction has not been received (S607: NO), the CPU 211 performs the length measurement process (S608). Optionally, the CPU 211 may prompt the user to ask whether the measurement of the sheet length is to be performed before proceeding to S608.

Next, the sheet length measurement process will be described referring to a flowchart shown in FIGS. 11A and 11B. In the sheet length measurement process, step S501 of FIG. 8A is replaced with step S701. It should be noted that, in the detail measurement process shown in FIGS. 8A and 8B, the measurement results are transmitted, while in the sheet length measurement process, the CPU 211 executes the measurements by the printer 200 itself.

In the sheet length measurement process, the CPU 211 determines whether the sheet information of the die cut label is included in the sheet information DB 243 or the sheet length measurement instruction designating the die cut label is received (S701). It is noted that the printer 200 according to the present embodiment is configured to receive the sheet length measurement instruction designating the sheet type.

When it is determined that the sheet information of the die cut label is included in the sheet information DB 243 or the sheet length measurement instruction designating the die cut label is received (S701: YES), the CPU 211 proceeds to S205 and executes the calibration function with prioritizing the die cut label. On the other hand, when it is determined that the sheet information of the die cut label is not included in the sheet information DB 243 and the sheet length measurement instruction designating the die cut label has not been received (S701: NO), the CPU 211 proceeds to S211 and executes the calibration function with prioritizing the marked medium.

In the sheet length measurement process, when the printing medium is determined to be one of the die cut label or the marked medium, a list of the sheet information which meets the sheet width and sheet length obtained from the sheet information DB 243 is displayed, and the process returns to the main body setting process. In the main body setting process, it is determined whether or not the user selection from the displayed list or a registration of a new setting is received (S609). When it is determined that the user selection from the displayed list or the registration as the new setting is received (S609: YES), the CPU 211 updates the print setting by updating the sheet information thereof to the selected sheet information (S610) and terminates the main body setting process. It is noted that the process of S610 is an example of a second setting process or setting process.

When it is determined that the cancellation is received (S607: YES), or the selection from the displayed list or registration of the new setting has not been received (S609: NO), the CPU 211 does not update the print setting and terminates the main body setting process.

As described in detail above, according to the second embodiment of printer 200, the CPU 211 performs the measurement of only the width of the sheet which does not require feeding of the sheet, and extracts the sheet information which meet the measurement result from the sheet information DB 243. When the user input the setting instruction from among the extracted sheet information, the CPU 211 sets sheet information subjected to the setting as the sheet size to be used for printing. In this case, since the printer 200 does not feed the sheet, waste of the sheet can be avoided.

It is noted that the present embodiment is only an example and aspects of the present disclosures should not be limited to by the above-described embodiment. Rather, the above-described embodiment can be modified in various ways without departing from aspects of the present disclosures. For example, the number of PCs or the number of the printers should not be limited to the numbers shown in drawings. Further, a printing method employed in the printer 2 or the printer 200 does not need to be limited to the thermosensitive method but, for example, a thermal transferring method, an inkjet method or an electrophotographic imaging method may be employed. Furthermore, the printing medium does not need to be limited to the label sheet but a roll sheet or a cut sheet may be employed.

In the first or second embodiment, the print setting is updated by setting the sheet information selected from the list of the sheet information to the sheet information of the print setting. However, aspects of the present disclosures should not be limited to such a configuration. For example, not only the setting to the print setting but also the registration instruction to the sheet information DB 43 may be received for updating. When the registration instruction is received, the new sheet information may be stored in the custom sheet information 432 of the sheet information DB 43.

It is noted that the range of the sheet information used for the selection list 430 generated in S101 of the type-designated setting process may be set, in advance, by the sheet information setting APP 42 or a user selection of the sheet information may be received.

The sheet type is not necessarily be limited to the above-described three types, but further sheet types and measurement instructions for other sheet types may be employed. Further, in the measurement of the sheet length, the sheet type included in the default sheet information may be prioritized. Furthermore, the CPU may not be configured to receive the cancellation instruction in S111 or S607 in respective flowcharts.

In any of flowcharts disclosed in the embodiments, the order of a plurality of processes in a plurality of steps may be changed arbitrarily or may be performed in parallel as far as the consistency is maintained.

Each process disclosed in the embodiments may be performed by a single CPU, multiple CPUs, hardware such as an ASIC, or any combination thereof. Further, each of the processes described in the embodiments may be realized in various ways such as a method, a non-transitory computer-readable recording medium containing computer-executable instructions (i.e., a program) to perform a method, or the like.

What is claimed is:

1. A non-transitory computer-readable recording medium for an information processing apparatus having a user interface, a communication interface and a controller, the image forming apparatus being connectable to a printer, the recording medium storing instructions which cause, when executed by the controller, the image processing apparatus to perform:

a measurement instruction receiving process of receiving a user input of a measurement instruction of a sheet size through the user interface of the image processing apparatus;

when the measurement instruction is received in the measurement instruction receiving process, a first transmission process of transmitting a first request requesting for execution of a first measurement to measure a width of a sheet to the printer through the communication interface, the printer being configured to measure the sheet loaded to the printer and output a measurement result in response to the first request;

when receiving a first measurement result, which is the measurement result transmitted by the printer in response to the first request, through the communication interface:

an extraction process of extracting, from among sheet data stored in a memory of the information processing apparatus and including information of a width and a length and sheet type of each sheet, sheet data corresponding to the width that meets the sheet width in the received first measurement result from the sheet data; and a first setting receiving process of prompting the user to select one piece of the sheet data from the sheet data extracted in the extraction process and receiving a setting instruction regarding the selected sheet data through the user interface;

when the setting instruction is received in the first setting receiving process, a first setting process of setting information included in the sheet data subjected to setting as a sheet size to be used for printing;

when the setting instruction is not received in the first setting receiving process, a second transmission process of transmitting a second request requesting execution of a second measurement to measure a length of the sheet with identifying a sheet type to the printer through the communication interface;

the printer being configured such that, when receiving the second request, the printer feeds the sheet loaded to the printer to measure a length of the sheet with regarding the sheet type as an identified sheet type that is identified by the second request and output the measurement result; and when the printer which received the second request measures the length of the sheet with regarding the sheet type as the identified sheet type, receives the second measurement result which is the measurement result of the sheet with regarding the sheet type as the identified sheet type through the communication interface, a second setting process of setting information included in the received second measurement result as the sheet size used for printing.

2. The recording medium according to claim 1, wherein, in the second transmission process, a plurality of second requests can be transmitted sequentially with changing the identified sheet type, and wherein the printer is configured to measure the sheet length in accordance with the sheet type identified by the second request every time when the second request is received.

3. The recording medium according to claim 2, wherein, when the sheet data extracted in the extraction process includes sheet data of a sheet of which sheet type is a first sheet type and does not include sheet data of a sheet of which sheet type is a second sheet type which is different from the first sheet type, the second request with the sheet type being set to the first sheet type is transmitted to the printer, and wherein, when the sheet length of the sheet which is regarded as the sheet of the first sheet type cannot be measured, the second request with setting the sheet type to the second sheet type is transmitted to the printer.

4. The recording medium according to claim 2, wherein the memory stores custom sheet data which is sheet data including user-defined sheet size information, and wherein, when the custom sheet data stored in the memory includes sheet data of a sheet of which sheet type is a first sheet type and does not include sheet data of a sheet of which sheet type is a second sheet type which is different from the first sheet type, the second request with the sheet type being set to the first sheet type is transmitted to the printer, and wherein, when the sheet length of the sheet which is regarded as the sheet of the first sheet type cannot be measured, the second request to set the sheet type to the second sheet type is transmitted to the printer.

5. The recording medium according to claim 2, wherein the memory stores custom sheet data which is sheet data including user-defined sheet size information, and wherein, when at least one of the custom sheet data stored in the memory and the sheet data selected to be used for printing includes sheet data of a sheet of which sheet type is a first sheet type and does not include sheet data of a sheet of which sheet type is a second sheet type which is different from the first sheet type, the second request with the sheet type being set to the first sheet type is transmitted to the printer, and wherein, when the sheet length of the sheet which is regarded as the sheet of the first sheet type cannot be measured, the second request with setting the sheet type to the second sheet type is transmitted to the printer.

6. The recording medium according to claim 2, wherein the memory stores custom sheet data which is sheet data including user-defined sheet size information and a print setting of a print job which was output to the printer in the past, and wherein, when at least one of the custom sheet data and the sheet data included in the print setting of the print job, both of which are included in the sheet data stored in the memory, includes sheet data of a sheet of which sheet type is a first sheet type and does not include sheet data of a sheet of which sheet type is a second sheet type which is different from the first sheet type, the second request with the sheet type being set to the first sheet type is transmitted to the printer, and wherein, when the sheet length of the sheet which is regarded as the sheet of the first sheet type cannot be measured, the second request with setting the sheet type to the second sheet type is transmitted to the printer.

7. The recording medium according to claim 2, wherein, in the second transmission process, the second request is transmitted by identifying the sheet type to the first sheet type which is designated through the user interface, and wherein, when the sheet length of the sheet which is regarded as the sheet of the first sheet type cannot be measured, the second request to set the sheet type to a second sheet type which is different from the first sheet type is transmitted to the printer.

8. The recording medium according to claim 7, wherein, in the second transmission process, the controller receives a user selection whether a measurement of the sheet size is to be performed with regarding the sheet as the sheet of the second type when the sheet length was not measured with regarding the sheet as the sheet of the first sheet type, wherein, when the user selection to measure the sheet size is received, the controller transmits the second request to set the sheet type to the second sheet type to the printer, and wherein, when the user selection not to measure the sheet size is received, the controller does not transmit the second request to set the sheet type to the second sheet type.

9. A non-transitory computer-readable recording medium for an information processing apparatus having a user interface, a communication interface and a controller, the image forming apparatus being connectable to a printer, the recording medium storing instructions which cause, when executed by the controller, the image processing apparatus to perform:

a measurement instruction receiving process of receiving a user input of a measurement instruction of a sheet size through the user interface of the image processing apparatus;

when the measurement instruction is received in the measurement instruction receiving process, a measurement request transmission process of transmitting a measurement request requesting for execution of a particular sheet type measurement to measure a length of a sheet with identifying the sheet type to the printer through the communication interface, the printer having a measurement function to feed the printing medium loaded to the printer and measure the length of the sheet in accordance with the sheet type identified by the measurement request and output a result of the measurement when the measurement request is received; and when, in the printer that received the measurement request, the length of the sheet is measured with regarding the type of the sheet as the identified sheet type, and when the measurement result of the sheet in accordance with the identified sheet type is received through the communication interface, causes the controller to perform a setting process of setting the information included in the received measurement result as the sheet size to be used for printing, wherein, in the measurement request transmission process, multiple measurement requests can be sequentially transmitted with changing the sheet types to be identified, wherein, when sheet data stored in a memory of the information processing apparatus and including information of a sheet width, a sheet length and a sheet type includes sheet data of which sheet type is a first type and does not include sheet data of which sheet type is a second type which is different from the first type, the controller transmits the measurement request in which the sheet type of the sheet loaded to the printer is regarded as the first type, and wherein, when the sheet length cannot be measured with regarding the sheet type as the first type, the controller transmits the measurement request in which the sheet type of the sheet loaded to the printer is regarded as the second type.

10. A non-transitory computer-readable recording medium for an information processing apparatus having a user interface, a communication interface and a controller, the image forming apparatus being connectable to a printer, the recording medium storing instructions which cause, when executed by the controller, the image processing apparatus to perform:

a measurement instruction receiving process of receiving a user input of a measurement instruction of a sheet size through the user interface of the image processing apparatus;

when the measurement instruction is received in the measurement instruction receiving process, a measurement request transmission process of transmitting a measurement request requesting for execution of a particular sheet type measurement to measure a length of a sheet with identifying the sheet type to the printer through the communication interface, the printer having a measurement function to feed the printing medium loaded to the printer and measure the length of the sheet in accordance with the sheet type identified by the measurement request and output a result of the measurement when the measurement request is received; and when, in the printer that received the measurement request, the length of the sheet has been measured with the sheet being regarded as the sheet of the identified sheet type, and when the measurement result of the sheet in accordance with the identified sheet type is received through the communication interface, causes the controller to perform a setting process of setting the information included in the received measurement result as the sheet size to be used for printing, wherein, in the measurement request transmission process, multiple measurement requests can be sequentially transmitted with changing the sheet types to be identified, wherein, when the controller transmits the measurement request with identifying the sheet type as the first sheet type designated through the user interface, and wherein when the sheet length of the sheet which is regarded as the first type sheet, cannot be measured, the controller sets the sheet type of the sheet as a second type which is different from the first type.

11. An information processing apparatus, comprising:
a user interface;
a communication interface;
a memory; and
a controller configured to perform:
a measurement instruction receiving process of receiving a user input of a measurement instruction of a sheet size through the user interface of the image processing apparatus;

when the measurement instruction is received in the measurement instruction receiving process, a first transmission process of transmitting a first request requesting for execution of a first measurement to measure a width of a sheet to a printer connected to the information processing apparatus through the communication interface, the printer being configured to measure the sheet loaded to the printer and output a measurement result in response to the first request;

when receiving a first measurement result, which is the measurement result transmitted by the printer in response to the first request, through the communication interface, an extraction process of extracting, from among sheet data stored in a memory of the information processing apparatus and including information of a width and a length and sheet type of each sheet, sheet data corresponding to the width that meets the sheet width in the received first measurement result from the sheet data; and a first setting receiving process of prompting the user to select one piece of the sheet data extracted in the extraction process and receiving a setting instruction regarding the selected sheet data through the user interface;

when the setting instruction is received in the first setting receiving process, a first setting process of setting information included in the sheet data subjected to setting as a sheet size to be used for printing;

when the setting instruction is not received in the first setting receiving process, a second transmission process of transmitting a second request requesting execution of a second measurement to measure a length of the sheet with identifying a sheet type to the printer through the communication interface;

the printer being configured such that, when receiving the second request, the printer feeds the sheet loaded to the printer to measure a length of the sheet with regarding the sheet type as an identified sheet type identified by the second request and output the measurement result; and when the printer, which received the second request measures the length of the sheet with regarding the sheet type as the identified sheet type, receives the second measurement result which is the measurement result of the sheet with regarding that the sheet type as the identified sheet type through the communication interface, a second setting process of setting information included in the received second measurement result as the sheet size used for printing.

12. An information processing apparatus, comprising:
a user interface;
a communication interface;
a memory; and
a controller configured to perform:
a measurement instruction receiving process of receiving a user input of a measurement instruction of a sheet size through the user interface of the image processing apparatus;

when the measurement instruction is received in the measurement instruction receiving process, a measurement request transmission process of transmitting a measurement request requesting for execution of a particular sheet type measurement to measure a length of a sheet with identifying the sheet type to the printer through the communication interface, the printer having a measurement function to feed the printing medium loaded to the printer and measure the length of the sheet in accordance with the sheet type identified by the measurement request and output a result of the measurement when the measurement request is received; and when, in the printer that received the measurement request, the length of the sheet is measured with regarding the type of the sheet as the identified sheet type, and when the measurement result of the sheet in accordance with the identified sheet type is received through the communication interface, causes the controller to perform a setting process of setting the information included in the received measurement result as the sheet size to be used for printing, wherein, in the measurement request transmission process, multiple measurement requests can be sequentially transmitted with changing the sheet types to be identified, wherein, when sheet data stored in a memory of the information processing apparatus and including information of a sheet width, a sheet length and a sheet type includes sheet data of which sheet type is a first type and does not include sheet data of which sheet type is a second type which is different from the first type, the controller transmits the measurement request in which the sheet type of the sheet loaded to the printer is regarded as the first type, and wherein, when the sheet length cannot be measured with regarding the sheet type as the first type, the controller transmits the measurement request in which the sheet type of the sheet loaded to the printer is regarded as the second type.

13. An information processing apparatus, comprising:
a user interface;
a communication interface;
a memory; and
a controller configured to perform:
a measurement instruction receiving process of receiving a user input of a measurement instruction of a sheet size through the user interface of the image processing apparatus;

when the measurement instruction is received in the measurement instruction receiving process, a measurement request transmission process of transmitting a measurement request requesting for execution of a particular sheet type measurement to measure a length of a sheet with identifying the sheet type to the printer through the communication interface, the printer having a measurement function to feed the printing medium loaded to the printer and measure the length of the sheet in accordance with the sheet type identified by the measurement request and output a result of the measurement when the measurement request is received; and when, in the printer that received the measurement request, the length of the sheet has been measured with the sheet being regarded as the sheet of the identified sheet type, and when the measurement result of the sheet in accordance with the identified sheet type is received through the communication interface, a setting process of setting the information included in the received measurement result as the sheet size to be used for printing, wherein, in the measurement request transmission process, multiple measurement requests can be sequentially transmitted with changing the sheet types to be identified, and wherein, when the controller transmits the measurement request with identifying the sheet type as the first sheet type designated through the user interface, and wherein when the sheet length of the sheet which is regarded as sheet of the first type cannot be measured, the controller sets the sheet type of the sheet as a second type which is different from the first type.

14. A printer, comprising:
a user interface;
a memory; and
a controller configured to perform:
a measurement instruction receiving process of receiving a user input of a measurement instruction of a sheet size through the user interface of the image processing apparatus;

when the measurement instruction is received in the measurement instruction receiving process, a width measurement process of measuring a width of a sheet loaded to the printer;

an extraction process of extracting, from among sheet data stored in the memory and including information of a width and a length and sheet type of each sheet, sheet data corresponding to the width that meets the sheet width in the received first measurement result from the sheet data; and a first setting receiving process of prompting the user to select one piece of the sheet data extracted in the extraction process and receiving a setting instruction regarding the selected sheet data through the user interface;

when the setting instruction is received in the first setting receiving process, a first setting process of setting information included in the sheet data subjected to setting as a sheet size to be used for printing;

when the setting instruction is not received in the first setting receiving process, a second transmission process of transmitting a second request requesting execution of a second measurement to measure a length of the sheet with identifying a sheet type to the printer through the communication interface; and when the length of the sheet is measured with regarding the sheet type as the identified sheet type in the length measurement process, a second setting process of setting information included in the measurement result of the length measurement process as the sheet size used for printing.

15. A printer, comprising:
a user interface;
a memory; and
a controller configured to perform:
a measurement instruction receiving process of receiving a user input of a measurement instruction of a sheet size through the user interface of the image processing apparatus;

when the measurement instruction is received in the measurement instruction receiving process, a length measurement process of identifying a sheet type of the sheet loaded to the printer and feeding the sheet loaded to the printer to measure the length of the sheet in accordance with the identified sheet type;

when the length of the sheet regarding the sheet as the sheet of the identified sheet type is measured in the length measurement process, a setting process of setting the information included in the measurement result as the sheet size to be used for printing, wherein, in the length measurement process, the measurement can be performed by multiple times with changing the sheet types to be identified, wherein, when sheet data stored in the memory and including information of a sheet width, a sheet length and a sheet type includes sheet data of which sheet type is a first type and does not include sheet data of which sheet type is a second type which is different from the first type, the controller performs measurement with regarding the sheet loaded to the printer as the sheet of the first type, and wherein, when the sheet length cannot be measured with regarding the sheet type as the first type, the controller performs measurement regarding the sheet loaded to the printer as the sheet type is the second type.

16. A printer, comprising:
a user interface;
a memory; and
a controller configured to perform:
a measurement instruction receiving process of receiving a user input of a measurement instruction of a sheet size through the user interface of the image processing apparatus;

when the measurement instruction is received in the measurement instruction receiving process, a length measurement process of identifying a sheet type of the sheet loaded to the printer and feeding the sheet loaded to the printer to measure the length of the sheet in accordance with the identified sheet type;

when the length of the sheet is measured with regarding the sheet as the sheet of the identified sheet type in the length measurement process, a setting process of setting the information included in the measurement result as the sheet size to be used for printing, wherein, in the length measurement process, the measurement can be performed by multiple times with changing the sheet types to be identified, wherein, in the length measurement process, the controller is configured to:

measure the length of the sheet with regarding the type of the sheet loaded to the printer as a first sheet type designated through the user interface, and when the length of the sheet which is regarded as the sheet of the first type cannot be measured, measure the length of the sheet regarding the sheet as a second type sheet which is different from the first type sheet.

\* \* \* \* \*

UNITED STATES PATENT AND TRADEMARK OFFICE
CERTIFICATE OF CORRECTION

PATENT NO. : 11,216,227 B2
APPLICATION NO. : 17/087721
DATED : January 4, 2022
INVENTOR(S) : Po Chun Chew It is certified that error appears in the above-identified patent and that said Letters Patent is hereby corrected as shown below:

In the Claims

Column 24, Claim 1, Lines 51-52 should read:
face, a communication interface and a controller, the information processing apparatus being connectable to a printer Column 24, Claim 1, Lines 54-55 should read:
when executed by the controller, the information processing apparatus to perform:

Column 27, Claim 9, Lines 11-12 should read:
face, a communication interface and a controller, the information processing apparatus being connectable to a printer Column 27, Claim 9, Lines 19-20 should read:
through the user interface of the information processing apparatus;

Column 27, Claim 10, Line 64 should read:
the information processing apparatus being connectable to a printer, Column 27, Claim 10, Lines 66-67 should read:
when executed by the controller, the information processing apparatus to perform:

Column 28, Claim 10, Lines 3-4 should read:
through the user interface of the information processing apparatus;

Column 28, Claim 11, Lines 46-47 should read:
through the user interface of the information processing apparatus;

Signed and Sealed this
Eighteenth Day of October, 2022

Katherine Kelly Vidal
*Director of the United States Patent and Trademark Office*